United States Patent
Yamazaki et al.

(10) Patent No.: US 7,221,482 B2
(45) Date of Patent: May 22, 2007

(54) MEDIUM RECORDING COLOR TRANSFORMATION LOOKUP TABLE, PRINTING APPARATUS, PRINTING METHOD, MEDIUM RECORDING PRINTING PROGRAM, AND MEDIUM RECORDING COLOR TRANSFORMATION PROGRAM

(75) Inventors: Satoshi Yamazaki, Nagano (JP); Makoto Fujino, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1035 days.

(21) Appl. No.: 10/104,685

(22) Filed: Mar. 22, 2002

(65) Prior Publication Data

US 2002/0163669 A1 Nov. 7, 2002

(30) Foreign Application Priority Data

Mar. 26, 2001 (JP) .............................. 2001-087764
Oct. 30, 2001 (JP) .............................. 2001-333135

(51) Int. Cl.
*G06K 15/00* (2006.01)
*H04N 1/46* (2006.01)

(52) U.S. Cl. ....................................... 358/2.1; 358/518
(58) Field of Classification Search ................ 382/162, 382/167; 358/500, 515, 525, 530, 1.9, 2.1, 358/518

See application file for complete search history.

(56) References Cited

U.S. PATENT DOCUMENTS 5,953,499 A * 9/1999 Narendranath et al. ...... 358/1.9
6,075,614 A * 6/2000 Ohtsuka et al. .............. 358/1.1
6,081,617 A * 6/2000 Bangham et al. ........... 382/173
6,297,826 B1 10/2001 Semba et al.
6,650,772 B1 * 11/2003 Inoue et al. ................. 382/162

FOREIGN PATENT DOCUMENTS

JP 11-31329 11/1999
JP 2001-043344 2/2001

* cited by examiner

Primary Examiner—Jerome Grant, II
(74) Attorney, Agent, or Firm—Beyer Weaver LLP

(57) ABSTRACT

If there is considerable difference in volume between the color gamut of one image processing device and the color gamut of the other image processing device, high-rate compression occurs and changes chroma to a great degree, resulting in color unbalancing. For example, if an image of the leaves of a plant including shadows is transferred from an image input device to an image output device and reproduced, the shadows discolor and look dark brown. According to the invention, the color gamut of the first image processing device is rotated by a predetermined hue angle and compressed to fall within the color gamut of the second image processing device and color values in the former gamut are mapped to those in the later gamut. By color transformation based on the thus defined mapping, color transformation is executed. Thereby, second color image data determined by rotating the hue angle of first color image data can be obtained. In circumstances where a plurality of color gamuts are available on an image processing device, mapping is defined adaptively for each gamut, thereby finer adjustment can be performed. Consequently, color gamut mapping of the first and second image processing devices in a device-independent color space, wherein there is great difference between their color gamut volumes, can be corrected so that color unbalancing can be prevented even for different forms of color gamut that is the target gamut of color output.

22 Claims, 25 Drawing Sheets

| sR | G | B | C | M | Y | K |
|----|---|---|---|---|---|---|
| 0 | 0 | 0 | 0 | 0 | 0 | 255 |
| 0 | 0 | 255 | 255 | 255 | 0 | 0 |
| 255 | 255 | 255 | 0 | 0 | 0 | 0 |

(Lab) - - - → (Lab)'
• Hue Rotation
• Compression

Fig. 17

| Ink Set | A (6 Colors) | | | | B (7 Colors) | | |
|---|---|---|---|---|---|---|---|
| Paper Type | photo1 | photo2 | Plain Paper | | photo1 | photo2 | Plain Paper |
| Color Gamut | Large | Medium | Small | | Large | Medium | Small |
| Rotational Parameters | $\Delta\theta 1max$<br>$f1(\theta)$<br>$g1(L)$ | $\Delta\theta 2max$<br>$f2(\theta)$<br>$g2(L)$ | $\Delta\theta 3max$<br>$f2(\theta)$<br>$g3(L)$ | | $\Delta\theta 3max$<br>$f3(\theta)$<br>$g2(L)$ | $\Delta\theta 4max$<br>$f3(\theta)$<br>$g3(L)$ | $\Delta\theta 4max$<br>$f3(\theta)$<br>$g4(L)$ |
| LUT | 15b | 15c | 15d | | 15e | 15f | 15g |

Fig. 21

| Ink Set | A (6 Colors) | | | | B (7 Colors) | | |
|---|---|---|---|---|---|---|---|
| Paper Type | | photo1 | photo2 | Plain Paper | photo1 | photo2 | Plain Paper |
| Color Gamut | | Large | Medium | Small | Large | Medium | Small |
| Rotational Parameters | | $\Delta\theta 1max$ $f1(\theta)$ $g1(L)$ | $\Delta\theta 2max$ $f1(\theta)$ $g2(L)$ | $\Delta\theta 3max'$ $f2(\theta)$ $g3(L)$ | $\Delta\theta 3max$ $f3(\theta)$ $g2(L)$ | $\Delta\theta 4max$ $f3(\theta)$ $g3(L)$ | $\Delta\theta 4max$ $f3(\theta)$ $g4(L)$ |
| LUT | | 15b | 15c | 15d | 15e | 15f | 15g |

MEDIUM RECORDING COLOR TRANSFORMATION LOOKUP TABLE, PRINTING APPARATUS, PRINTING METHOD, MEDIUM RECORDING PRINTING PROGRAM, AND MEDIUM RECORDING COLOR TRANSFORMATION PROGRAM

BACKGROUND OF THE INVENTION

1. Field of the Invention

The present invention relates to a medium recording a color transformation lookup table, a printing apparatus, a printing method, a medium recording a printing program, and a medium recording a color transformation program.

2. Description of the Prior Art

Image processing devices such as displays and printers have their inherent color gamut; that is, the range of colors producible by the device. Different image processing devices usually have different volumes of color gamut. When handling even the same image, the color gamut of one image processing device is compressed to fall within the color gamut of the other image processing device, thereby the color image is expressed in the color gamut of the image output device. In common techniques for such compression, chroma contraction toward the lightness axis takes place in a Lab space, not actively causing hue change.

In color transformation according to the foregoing techniques, problems were posed which will be described blow.

If there is considerable difference in volume between the color gamut of one image processing device and the color gamut of the other image processing device, high-rate compression occurs and changes chroma to a great degree, resulting in color unbalancing. Due to the chroma change in certain hues, viewers might sense colors different from the inherent colors by color contrast. For example, the color gamut of an ink-jet printer using a CMYK ink set is characterized by quite lower chroma in the color region of the red hue to the green hue and in the low lightness range. If an image of the leaves of a plant including shadows presented on a display is printed with such printer, the dark green shadows cannot gain sufficient chroma and look dark brown by contrast with green in the surroundings.

SUMMARY OF THE INVENTION

To solve the problem, the object of the present invention is to provide a medium recording a color transformation program, a method of creating a color transformation table, a medium recording data in a color transformation table, an apparatus, a program, and a method for color transformation, and a color transformation table; that can prevent color unbalancing caused from color gamut mapping with great difference between color gamut volumes of input and output in a certain part thereof.

To attain the foregoing object, first color image data used on a first image processing device is transformed into second color image data used on a second image processing device, based on the relationship between color gamuts of the first image processing device and the second image processing device. By executing the color transformation, based on that the relationship between gamuts, the second color image data optimized by the rotation of the hue angle of the first color image data is obtained. This rotation is performed for color image data in a certain region of a color space. In the region where there is great difference in volume between the color gamut of the first image processing device and the color gamut of the second image processing device, hue rotation modifies the color gamut mapping so that high-rate gamut compression will not take place. Consequently, color unbalancing can be prevented.

Hereon, essentially, the hue of color image data in a certain region of the color space is rotated, and desirably, it is rotated toward the second image processing device's color gamut that is wider. However, a primary feature of the invention is enabling hue rotation toward a direction such that high-rate compression can be prevented eventually. The direction of rotation is not limited to one direction and the region in which rotation occurs is not limited to one region; rotation may be performed in a plurality of regions. The first and second image processing devices are not limited to specific ones and may be any device that reproduces images, using color image data; e.g., displays, printers, scanners, digital cameras, etc. These devices are not always separate ones. For example, a fax machine has a scanner as the first image processing device and a printer as the second image processing device, which are integrated therein, and the invention can be applied to the fax machine.

The Relationship of mapping defined so that hue rotation will take place in this way is registered in a color transformation lookup table that is created in advance. By reference to this color transformation lookup table, transformation of first color image data to second color image data is performed. Owing to the information obtained about the relationship between color gamuts of the first image processing device and the second image processing device defined in the lookup table created in advance, it is not necessary to execute hue rotation whenever transforming the first color image data into the second color image data and the resources for performing the color transformation function can be saved.

Basically, the color transformation lookup table may be constituted of such electronic data as to define the relationship between color gamuts of the first image processing device and the second image processing device and to thereby transform the first color image data into the second image data optimized by hue-rotation of the first color image data. In making the table, thus, various modifications could be suggested as long as it satisfies the basic constitution. One of the example is such that the table is made by mapping typical color data as the first color image data to corresponding data as the second color image data and color data for any point is calculated by interpolation. Another example is such that the table is built by mapping typical color values by the coordinates of the color gamut of the first image processing device to corresponding color values by the coordinates of the color gamut of the second image processing device in a device-independent color space and color values at any coordinates are calculated by interpolation.

Essentially, the relationship between color gamuts of the first image processing device and the second image processing device may be defined such that, in a certain color region in a color space, the hue angle of the second color image data is determined by rotating the hue angle of the corresponding first color image data by an angle as the result of color transformation. The result obtained by transforming the first color image data into the second color image data is important and the relationship between gamuts may be defined by any method, for which there is no restriction. A possible method is such that one-to-one mapping for transformation between the first color image data and second color image data is determined one by one.

In the invention, hue rotation is performed so that high-rate compression can be prevented and a color region for which the rotation takes place may be defined in different ways. In one preferred example of defining the extent of a color region, it is advisable to do so by lightness or/and hue. If a lightness range is defined, hue rotation can be performed in only a certain lightness range. If a hue range is defined, hue rotation can be performed in only a certain hue range. When a certain color region is defined in this way, the hue rotation in accordance with the invention can be effected as follows. It can exactly solve a problem caused by compression taking place in specific lightness and hue ranges, as is the case in the example of problem of the prior art that arises on the image of the leaves of a plant including shadows, while not affecting other colors for which no problem arises.

Although there is no restriction for the method of specifying the relationship between color gamuts of the first image processing device and the second image processing device as described above, it is quite burdensome to determine one-to-one mapping for all points in the gamut without using any transformation method about a huge amount of data to be handled by a computer. In one preferred example of easily defining the relationship between color gamuts of the first image processing device and the second image processing device, it is advisable that the relationship be defined through a process comprising a hue-angle rotation step in which the color gamut of the first image processing device is rotated by a predetermined hue angle in a certain color region in the device-independent color space and a compression step in which the gamut after being rotated is compressed to fall within the color gamut of the second image processing device. For a color region where high-rate compression is estimated if compression takes place without the application of hue rotation, hue rotation and compression enable color gamut compression at a rather low compression rate. The foregoing example can provide a scheme for defining the relationship between gamuts to enable mapping in a block in a certain region of the color gamut, thus making it unnecessary to do one-to-one mapping on a color-by-color basis.

As the device-independent color space, any of diverse color spaces such as Lab, XYZ, etc. can be adopted as color space. By gamut mapping of the first and second image processing devices in the device-independent color space, the relationship between gamuts can be clearly defined without taking color dependence on the devices into consideration. After hue rotation of the gamut of color input by a predetermined angle, the rotated gamut is compressed to fall within the color gamut of the second image processing device. Consequently, high-rate compression is prevented. During this process, the minimum requirement is that the hue of color gamut is rotated to gain chroma somewhat higher enough to prevent high-rate compression. To meet this requirement, the angle of rotation can be properly selected, according to the required chroma and the assumed compression rate. Hereon, there is no restriction for lightness before and after rotation. By executing hue rotation and compression without actively causing lightness change, processing can be performed without changing the lightness of colors and color unbalancing that results from considerable color change can be prevented.

By way of illustration, as suitable devices to which the invention is applicable, the first image processing device is a display and the second image processing device is a printer. In this example, the color transformation function is implemented to transform the first color image data expressed in an RGB color space into the second color image data expressed in a CMYK color space on the assumption of the following. The first color image data is expressed in the predefined device-independent color space, the hue rotation and compression are executed, and then the second color image data is obtained, based on the resulting gamut data after the rotation and compression in the coordinates of the predefined device-independent color space.

To perform management of color compatibility between the display and printer, it is required that a specific device-independent color space intervenes therebetween in transforming the first color image data expressed in the display's device-dependent or device-independent RGB color space into the second color image data expressed in the printer's device-dependent CMYK color space. By thus performing the hue rotation of the invention in the device-independent color space, the management of color compatibility as well as the color unbalancing prevention can be accomplished.

Colors constituting the color gamut of an image processing device can be expressed by combinations of a plurality of color components. Color components used to express colors in a color space are usually three colors, but three colors are not always used for defining the relationship of color gamut. Before or/and after the hue-angle rotation step, such relationship may be defined by performing color separation into color components by which the number of color components in a color space that constitute the color gamut may increase or decrease.

Specifically, by means of the color separation into color components, three color components in the device-independent color space can be changed to any number of color components. The relationship of color gamuts can be defined to directly match the number of color components used by the image processing device. For example, if the second image processing device is a printer, it is conceivable that color components such as four CMYK colors, six colors of CMYK plus lc (light cyan) and lm (light magenta), and seven colors of CMYKlclm plus DY (dark yellow) are available on the printer. Once RGB color data from the display's color gamut has been mapped to CMY color data, the CMY color data is transformed into CMYK color data or the like by color separation into color components, so that RGB color data can easily be mapped to CMYK color data or the like.

In this way, the relationship between gamuts between the first and second color data directly matching the number of color components used by the image output device can be obtained.

The primary aim of the invention is defining an optimum relationship of color gamuts between the first image processing device and the second image processing device described above so that compression to a great degree can be prevented. In example in view hereof, it is advisable to execute the step of hue-angle rotation on the condition that a compression rate estimated for compression without the application of hue-angle rotation exceeds a predetermined threshold value thereof for defining the relationship between color gamuts of the first image processing device and the second image processing device. In this example, if the compression rate exceeds the threshold value, hue change (rotation) takes place to decrease the compression rate less than the threshold value. In consequence, excessive compression is prevented and color unbalancing can be prevented. For color regions for which the above compression rate is less than the threshold value, thus hue rotation is not necessary, the execution of the step of hue-angle rotation can be inhibited.

Color unbalancing caused by high-rate compression occurs in a color region where even the highest chroma of the color gamut of the second image processing device is very low. In example of preventing color unbalancing in such color region, it is advisable to execute the step of hue-angle rotation on the condition that chroma estimated to be given after compression without the application of hue-angle rotation is lower than a predetermined threshold value thereof for defining the relationship between color gamuts of the first image processing device and the second image processing device. In this example, thus, compression resulting in extremely low chroma is prevented and color unbalancing can be prevented. Besides, compression causing so great displacement as to change chromatic colors to achromatic colors can be prevented. Furthermore, for color regions for which the above chroma estimated after compression is higher than the threshold value, thus hue rotation is not necessary; the execution of the step of hue-angle rotation can be inhibited.

In another example of preventing great compression, it is advisable to execute the step of hue-angle rotation on the condition that a ratio obtained by dividing chroma estimated to be given after compression with the application of hue-angle rotation, by chroma estimated to be given after compression without the application of hue-angle rotation, exceeds a predetermined threshold value thereof for defining the relationship between color gamuts of the first image processing device and the second image processing device. In this example, by comparison between the effect of compression in the case where hue rotation is performed and that in the case where hue rotation is not performed, an angle of hue rotation giving desirably high chroma can be determined.

Furthermore, an angle of hue rotation for preventing great compression can be determined, based on diverse factors. In example in view hereof, it is advisable to determine the hue-rotation angle as a function of any of or combination of lightness, chroma, and hue before hue-angle rotation, in the relationship between color gamuts of the first image processing device and the second image processing device. In this example, the rotation angle in the color gamut is determined, depending on the shape of the color gamut of the first image processing device and that of the second image processing device, and the required displacement by rotation varies, depending on lightness, chroma, and hue before rotation.

By determining the displacement by rotation as a function of any of or combination of lightness, chroma, and hue, it becomes possible to set the displacement by rotation to exactly follow the color gamut change. By using function forms (curves) that smoothly increase and decrease, the displacement by rotation gradually changes and tone jumps by hue rotation can be prevented. The color gamut somewhat differs, depending on the image-processing media, device type and used ink of the second image processing device, and the image display device. It is also possible to slightly change the displacement by rotation for adjusting such difference. If the shapes of the gamuts of the second image processing device differs from each other, any of or combination of lightness, chroma, and hue dependence of said hue-rotation angle in said function vary.

In example of carrying out the invention in a color region where hue rotation functions effectively, it is advisable that if a region where most of the color gamut of the first image processing device lies out of the color gamut of the second image processing device exists and at the same time its neighboring region has a wider color gamut of the second image processing device than that of the first image processing device, the hue angle is rotated toward the neighboring region to thereby define said relationship of color gamut.

Before hue-angle rotation, if most of the color gamut of the first image processing device lies out of the color gamut of the second image processing device, and if the gamut of the first image processing device is compressed without the application of hue rotation, high-rate compression takes place. Thus, by executing hue rotation in such color region, great compression can be prevented. If a region exists adjacently where the color gamut of the second image processing device is wider than the color gamut of the first image processing device, by executing hue rotation, points of hues not subjected to high-rate compression can be selected with the hues not changing greatly. In consequence, fine color images can be obtained, wherein color unbalancing does not occur.

Particularly, when the color gamut of a display and the color gamut of a general ink-jet printer are compared, around the yellow hue in the low lightness range, most of the color gamut of the display lies out of the color gamut of the ink-jet printer, and in its adjacent region of green hue to cyan hue, the color gamut of the printer is wider than the color gamut of the display. Thus, by rotating the color gamut around the yellow hue toward the green hue, color unbalancing that results from gamut mapping in this color region can be prevented. Even if the foregoing image of the leaves of a plant including shadows is printed, the print result is free from such discoloration that the shadows look dark brown.

In another example of targeting a color region where hue rotation functions effectively from another viewpoint, it is advisable that if a region where the color gamut of the second image processing device is smaller than that of the first image processing device exists and at the same time its neighboring region has a larger color gamut of the second image processing device than that of the region, the hue-angle is rotated toward the larger color gamut to thereby define the relationship of color gamut.

In this example, if a region exists where the color gamut of the second image processing device is smaller than the color gamut of the first image processing device and adjacently the color gamut of the second image processing device exists that is greater than the color gamut of the first image processing device in that region, by executing hue rotation and compression, the compression rate can be lowered. Because the hue rotation takes place toward the adjacent color gamut, points of hue not subjected to high-rate compression can be selected with the hues not changing greatly. In consequence, fine color images can be obtained, wherein color unbalancing does not occur.

When the color gamut of a display and the color gamut of a general ink-jet printer are compared, around the yellow hue in the low lightness range, the color gamut of the ink-jet printer is smaller than the color gamut of the display, and in its adjacent region of green hue to cyan hue, the color gamut of the printer is wider than the color gamut of the display around the yellow hue. Thus, by rotating the color gamut around the yellow hue toward the green hue, color unbalancing that results from gamut mapping in this color region can be prevented. Even if the foregoing image of the leaves of a plant including shadows is printed, the print result is free from such discoloration that the shadows look dark brown.

As noted above, the color gamut of an image processing device differs, depending on the type of image-processing media used and other factors. In example of accommodating different forms of color gamut, it is advisable to perform color transformation as follows. When a plurality of color gamuts of different shapes are available that belong to either of or combination of the first image processing device and the second image processing device, the first color image data is transformed into the second color image data, based on the mapping therebetween defined for each color gamut. When a plurality of color gamuts of different shapes are available on an image processing device, if hue rotation is executed on the same displacement setting for all color gamuts, over-rotation or under-rotation of hue causing color unbalancing may occur for some color gamut. For color gamuts, from the viewpoint of color transformation precision as well, it is desirable to perform color transformation using the color data mapping relationships defined for each color gamut.

According to this manner that color transformation is performed, based on the relationships between color gamuts defined for each color gamut, color unbalancing can be prevented for any color gamut applied. Diverse circumstances can be supposed where color gamuts of an image processing device are available. For example, it can be said that the color gamut differs, depending on the kind of consumables. For a printer, its color gamut somewhat changes by the replacement of image-processing medium and ink set. For a scanner, its color gamut somewhat changes by the change of document type such as translucent one and reflecting one. Moreover, the color gamut somewhat changes when the type of the image processing device changes, and even for the same device type, difference in gamut may occur between individual devices. The foregoing manner can accommodate such difference in color gamut.

In example of defining color data mapping relationships for each color gamut, it is advisable to define different relationships for each gamut by obtaining different forms of mapping for each gamut. In the invention, because the relationship of color gamuts between the first and second image processing devices is defined by performing the step of hue rotation, by performing this step for each color gamut, the relationships between color gamuts can be defined for each gamut. For each color gamut, it is not required that completely different methods of gamut mapping be used. Based on the same gamut mapping method, by using different values of its related parameters, different gamut mapping can be produced. However, it is not necessary to assign different values to all parameters for each color gamut and common values of some parameters can be used.

In this way, different gamut mapping can easily be obtained adaptively for each color gamut shape.

The following is an example to obtain gamut mapping adaptively for each color gamut shape. If there is a small color gamut in the color gamuts of the second image processing device, hue-rotation angle of the small color gamut may be set greater than that of the other color gamut of the second image processing device, and thereby giving the small color gamut the same chroma as that of the other color gamut. Like this, setting separately the hue-rotation angle for each color gamut permits of enough chroma to be needed for each color gamut, also leading to the prevention of color transformation under high-rate compression as well as of color unbalance. Needless to say, proper adjustment of the hue-angle rotation for prevention of excessive hue rotation and of color unbalancing caused thereby is possible.

In example of gamut mapping that varies for each color gamut, it is advisable to effect the step of hue rotation as follows. If the shapes of the gamuts of the second image processing device differs from each other, the displacement by rotation is determined such that the function varies adaptively for each color gamut, depending on any of or combination of lightness, chroma, and hue before hue-angle rotation. In the mode that, in the step of hue rotation, an angle of rotation is determined by a function depending on any of or combination of lightness, chroma, and hue before hue-angle rotation, by adapting the function for each color gamut, gamut mapping that varies for each color gamut can be obtained easily and very subtly.

To obtain different gamut mapping for different color gamut shapes, a mode is applied in which gamut mapping is adjusted for each color gamut by following the tendency that the displacement by rotation is set smaller for greater color gamut and this mode is important for an image processing device on which a plurality of color gamuts are available. However, the mode in which the displacement by hue rotation is invariably set smaller for greater color gamut does not apply to all cases. The following is also possible. The hue-rotation angle of a certain exceptional color gamut of the second image processing device may be set smaller than the other, where this exceptional color gamut of the second image processing device is smaller than the other color gamut of the second image processing device. In other words, it is possible to set the displacement by rotation in conflict with the tendency that the displacement by rotation is set smaller for greater color gamut.

As the result of color transformation of the invention, color appearance of images output by the second image processing device is important. After color transformation is executed, the color appearance of images output by the second image processing device is visually checked and then final tuning may be required. Tuning in conflict with the tendency that the displacement by rotation is set smaller for greater color gamut is allowable. For example, if kinds of image-processing media and ink sets can be used on a printer, the printer has color gamuts for each combination of image-processing medium and ink set. Even if the prevention of color unbalancing is achieved separately for each color gamut, change of image-processing media and/or ink set may cause the printer to output color images that are different in color impression as compared with those produced before the change and the user may want to prevent such difference.

In such cases, the color appearance of an image produced with each combination of image-processing medium and ink set may differ, depending on the relativity of one color to its surrounding color. If hue rotation is executed straightforwardly with the displacement set in accordance with the tendency that the displacement by rotation is set smaller for greater color gamut, print results of even the same image may look different in color impression. When uniform color impression even with color gamuts is reckoned important, tuning is performed, and the set displacement by hue rotation may be in conflict with the above tendency for some color gamut. Such tuning is preferable if uniform print results even with color gamuts are reckoned important and allowable in the invention.

In this way, print images of uniform color impression after color transformation can be obtained.

For color transformation purposes, not only the hue rotation step of the invention, but also other steps may be taken from different viewpoints. Often, as the result of execution of the combination of the steps, the relationship between color gamuts of the first image processing device and the second image processing device is defined. When the above relationship is defined as the result of processing including other steps, for some color gamut, it may be preferable to set the displacement by hue rotation in conflict with the tendency that the displacement by rotation is set smaller for greater color gamut to eventually obtain fine color appearance. Accordingly, such tuning is allowable.

In example of color transformation that is executed, based on the relationship between color gamuts defined for a plurality of color gamuts, it is advisable to obtain another lookup table as follows. The relationship between color gamuts of the first image processing device and the second image processing device is obtained by correcting the sets of values which are stored in a certain storage area and represent the relationship of the color gamuts. In this example, it is not necessary to have the respective lookup tables for all color gamuts of the second image processing device to maintain the predefined relationship between the color gamuts of the first and second image processing devices for each gamut. Only a minimum number of lookup tables are required for maintaining such relationship with regard to a particular color gamut of the second image processing device and thus storage area can be reduced. For the correction method, any of diverse methods can be adopted. For example, one method is as follows. The shape of a particular color gamut of the second image processing device and the tendency of change of mapping relationship relative to that shape, estimated in advance, are maintained. By comparison between the shape of any color gamut of the second image processing device and the above color gamut shape, how the color gamut has changed is determined, based on which the mapping relationship is corrected. Another method is as follows. By comparing the reference relationship with regard to a particular color gamut of the second image processing device and that for another gamut thereof, only color data of difference is maintained. During the processing for color transformation, color data of difference from the reference relationship about the particular color gamut is replaced.

Supposing that color transformation in accordance with the invention is practically used, it is preferable that the user can choose whether to execute the color transformation. In example in view hereof, it is advisable to take the following manner. The sets of values which represent the relationship with the application of hue-angle rotation and the relationship without the application of hue-angle rotation, are made and stored in a certain storage area; and the relationship is decided based on the mode which is selected in advance by a user.

In this manner, the user can choose whether to execute color transformation based on the relationship between color gamuts defined by the execution of hue rotation in accordance with the invention or execute color transformation based on the relationship defined in other way. Color transformation execution according to the mapping relationship defined by the execution of hue rotation of the invention is advantageous in that color unbalancing can be prevented. However, to meet the user's need that may differ, according to circumstances, it is preferable to provide options including the color transformation in accordance with the invention. For example, some users may make a fine adjustment of colors on the first image processing device and want exactly the same colors output from the second image processing device. For such users, it is difficult to output a color image to the user's intention if the color transformation in accordance with the invention is performed. Thus, it is convenient for such users that color transformation can be performed, based on the mapping relationship defined without the execution of hue rotation of the invention.

The mapping relationship defined without the execution of hue rotation includes all mapping relationships not modified by hue rotation. When executing color transformation, it is advisable that the mapping relationship to be selected can be specified by mode selected by the user beforehand. For example, explicit modes, such as hue rotation mode and other mode may be applied. Alternatively, non-explicit modes such as superior shadowing mode and normal mode may be applied. A mode is selected beforehand and this means that a mode be selected in any case before color transformation. As means for facilitating mode selection, any of diverse means can be taken; for example, default selection that may be set and reset at any time, a mode selection dialog box presented before color transformation.

By the way, the above-mentioned color transformation program is stored in a medium. The medium may be a magnetic recording medium, a magneto-optic recording medium, or any other recording medium which will be developed in future, all of which can be considered applicable to the invention in all the same way. Example of the invention as software and hardware combination makes no difference in the concept of the invention. Example of the invention includes such a manner that part thereof is recorded on a medium in advance and will be read appropriately as required. Furthermore, duplicates of the above medium as primary and secondary duplicate products and the like are considered equivalent to the medium without doubt.

According to the processing involved in the invention, a color transformation lookup table to be used for color transformation can be created. Thus, the invention can be regarded as a method of creating a color transformation lookup table. When color transformation is called for, reference to the created color transformation lookup table makes it unnecessary to execute hue rotation each time color transformation is performed. Color transformation can be performed by referring to only the lookup table containing the result of hue rotation and related processing. Thus, it can be said that the table itself that contains a set of color data at sample points to be referenced is built, using the technical concept of the invention.

Furthermore, such color transformation lookup table is referenced when a printing program for print operation is executed on a computer. It is easily understandable that the invention is applicable as a tangible printing apparatus in which such computer is incorporated. In other words, the invention is effective as not only a color transformation lookup table, but also a printing apparatus. In view of the nature of the invention that processing involved is carried out by following a predetermined procedure, the invention functions as a method invention for color transformation. Conceivably, such color transformation method may be solely applied to practical use or incorporated into some device or system and applied with another methodology. Not limited to a certain mode of application, the concept of the invention comprehends a variety of modes in which the invention is embodied and appropriate modifications are permissible within the range of the invention.

BRIEF DESCRIPTION OF THE DRAWINGS

FIG. 17 shows a table listing symbolic values of parameters depending on color gamuts for each combination of ink set and image-processing medium.

FIG. 21 shows another table listing symbolic values of parameters depending on color gamuts for each combination of ink set and image-processing medium.

DETAILED DESCRIPTION OF THE PREFERRED EMBODIMENTS

This section describes preferred embodiments of the invention in the following aspects which will be described in order:

(1) Configuration for implementing the invention
(2) Print operation
(3) LUT creation process
(4) Hue rotation
(5) Preferred Embodiment 2
(6) Preferred Embodiment 3
(7) Preferred Embodiment 4
(8) Preferred Embodiment 5
(9) Preferred Embodiment 6

(1) Configuration for Implementing the Invention

Figure 1:
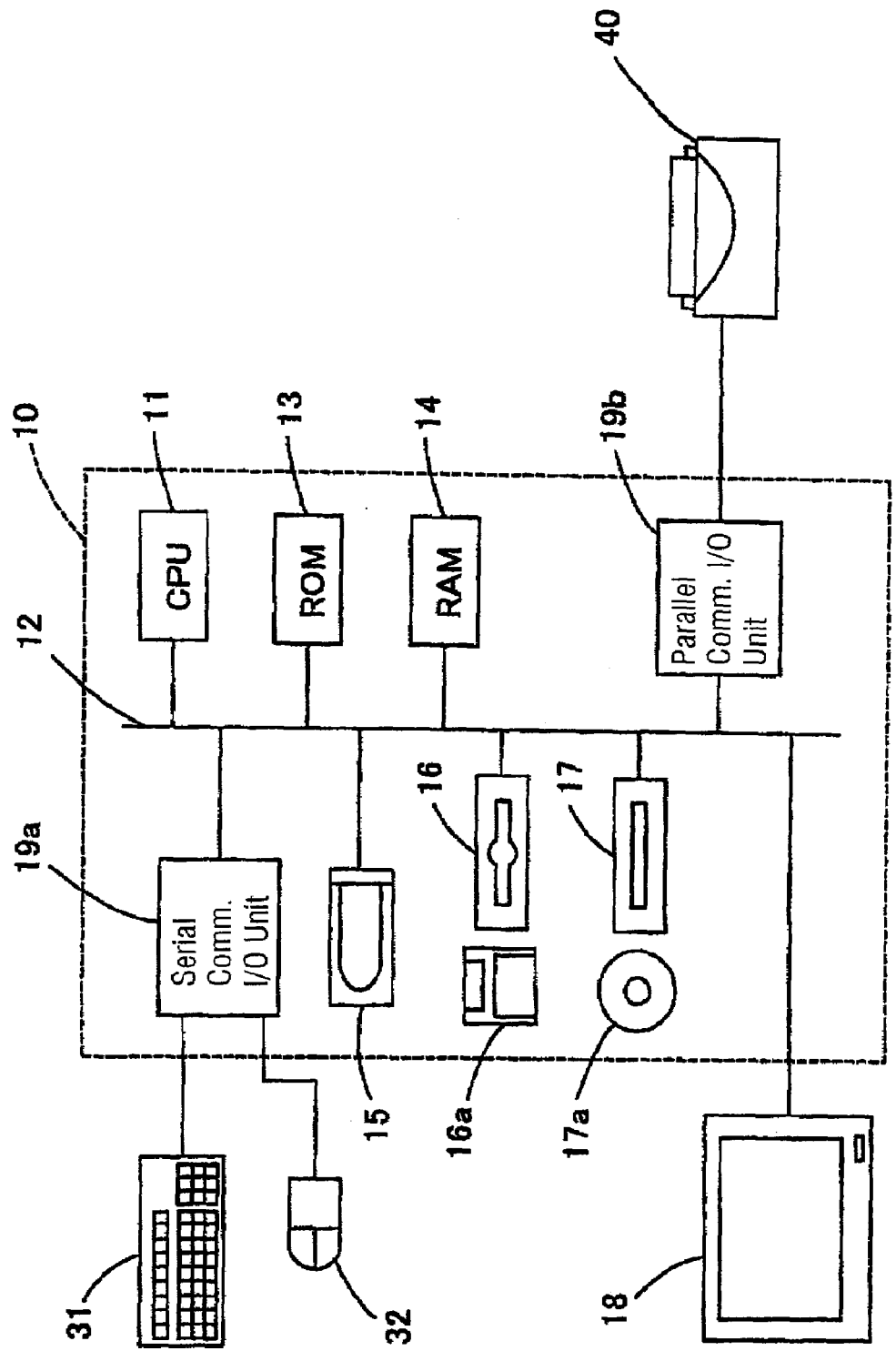
FIG. 1 is a block diagram showing the simplified hardware structure of a computer that is able to execute a color transformation program provided in accordance with one preferred embodiment of the invention.
Figure 2:
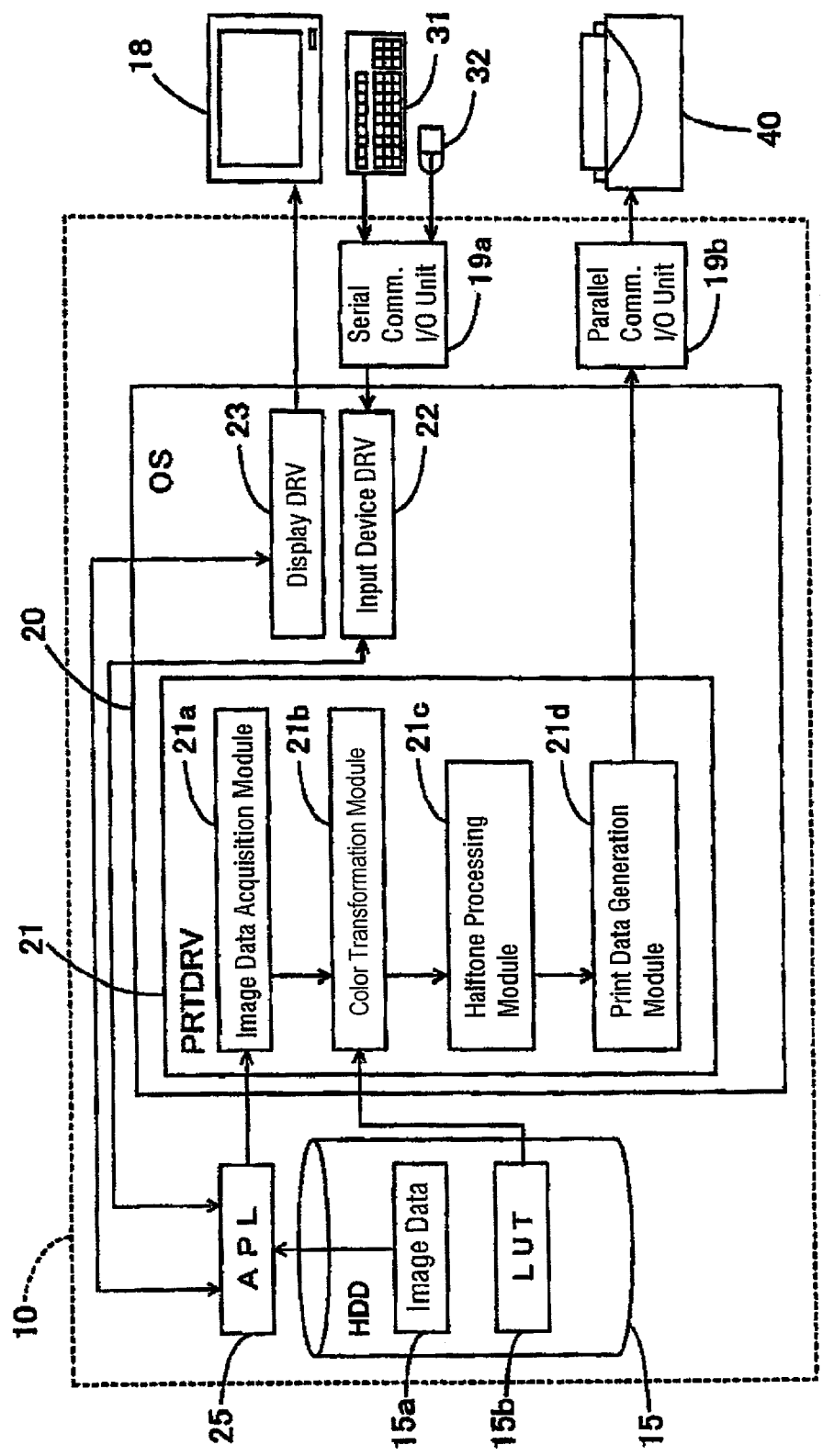
FIG. 2 is a block diagram showing the simplified structure of the OS and related components in the computer wherein the color transformation program is provided as a color transformation module.

FIG. 1 shows the simplified hardware structure of a computer that executes a color transformation program provided in accordance with the invention. FIG. 2 shows the simplified structure of the OS and related components in the computer wherein the color transformation program is provided as a color transformation module 21b of a printer driver which is incorporated in the OS. CPU 11 of the computer 10 is the center of arithmetic processing and can gain access over a system bus 12 to ROM 13 and RAM 14 in which BIOS or the like has been stored.

To the system bus 12, a hard disk drive (HDD) 15, floppy disk drive 16, and CD-ROM drive 17 which are configured as external storage devices are also connected. The OS 20, application program (APL) 25, and the like stored in the disk on the HDD 15 are transferred to the RAM 14 and the CPU 11 properly accesses the ROM 13 and the RAM 14 and executes the software. In other words, the CPU executes kinds of programs by using the RAM 14 as a temporary working area.

To the computer 10, input devices for user operation such as a keyboard 31 and mouse 32 are connected via a serial communication I/O unit 19a and a display 17 for visual presentation is also connected via a video board which is not shown. Its connection to a printer 40 can be made via a parallel communication I/O unit 19b. As the computer 10 whose simplified structure is now explained, a generally configured personal computer can be used. Of course, computers applicable to the invention are not limited to personal computers. Although a so-called desktop-type computer is assumed to be used in the present preferred embodiment, a notebook-size computer, and a computer with mobile features may be used. Besides, the connection interface between the computer 10 and the printer 40 is not limited to the above-mentioned one. Any can be adopted from diverse modes of connection such as serial interface, SCSI, and USB, including any connection mode that will be developed in future.

Although a suite of programs is stored in the disk on the HDD 15 in the present embodiment, the storage medium is not limited to the hard disk. Other storage media, for example, a floppy disk 16a and a CD-ROM 17a may be used. The programs stored in these storage media are read via the floppy disk drive 16 and CD-ROM drive 17, transferred into the computer 10, and installed in the disk on the HDD 15a. Then, the programs are read via the HDD 15 into the RAM 14 and run for computer control. In addition to the above-mentioned storage media, a magneto-optic disk or the like may also be used. As a semiconductor device, a non-volatile memory or the like such as a flash card can be used. Alternatively, the programs can be downloaded by accessing an external file server via a modem and over a communication network; in this case, the communication network is a transmission medium by which the invention is embodied for use.

On the computer 10 configured in accordance with the present preferred embodiment, the OS 20 is installed in which a printer driver (PRTDRV) 21, an input device driver (DRV) 22, and a display driver (DRV) 23 are incorporated as shown in FIG. 2. The display DRV 23 is a driver for controlling the operation of displaying images from image data and other presentations on the display 18. The input device DRV 22 is a driver for receiving code signals input from the above-mentioned keyboard 31 and mouse 32 via the serial communication I/O unit 19a and receiving user input.

APL 25 is an application program by which retouching a color image and other image processing can be executed and allows the user to print the color image with the printer 40 by operating the above-mentioned input devices for user operation under the run of the APL 25. For this print operation, the PRTDRV 21 is called. Under the control of the PRTDRV, image data expressing colors in the color gamut of the display 18 is acquired and color transformation is executed in which certain colors are mapped to colors available within the color gamut of the printer 40 by performing hue rotation. In consequence, this manner of color transformation enables the printer to print color images, preventing color unbalancing that results from mapping from the color gamut of display 18 to the color gamut of printer 40. For this purpose, the PRTDRV 21 comprises the above-mentioned color transformation module 21b and besides an image data acquisition module 21a, a halftone processing module 21c, and a print data generation module 21d.

The APL 25 makes the computer read image data 15a stored in the disk on the HDD15 into the RAM 14, then retouching and other processing can be performed for the image data. The display DRV23 makes the computer present an image on the display 18, based on the image data 15a read into the RAM 14. When the user performs input by operating the above-mentioned input devices, the APL 25 receives the user input through the input device DRV 22, interprets it, and instructs the computer to execute print operation, retouching, or other processing, according to the user input.

The image data 15a in the present preferred embodiment is dot-matrix data in which colors are expressed in tones of RGB (read, green, and blue) components in compliance with the sRGB standards. A lookup table (LUT) 15b, which will be explained later, may be built to contain data generated in such a manner as to transform the RGB-based data specific to the display 18 into CMYK (cyan, magenta, yellow, and black) based data. By altering the LUT 15a as required, it is possible to easily adapt the LUT 15b to another device of display 18 and printer 40 and change of image-processing medium or the like used on the printer 40.

When the APL 25 receives an input of request for executing print operation in the way described above, the image data 15a is acquired under the control of the image data acquisition module 21a and the image data acquisition module 21a activates the color transformation module 21b. The color transformation module 21b is run for transforming RGB tone values into CMYK tone values, and under its control, all dots of the image data 15a are transformed into CMYK-based dots. During this transformation, the color transformation module 21b makes the computer execute interpolation computation while referring to the LUT 15b stored in the disk on the HDD 15. Because the LUT 15b contains data generated through the processing of hue rotation and compression which will be explained later, color unbalancing that results from compression can be prevented in this color transformation.

The CMYK tone data generated by color transformation under the control of the color transformation module 21b is handed over to the halftone processing module 21c. The halftone processing module 21c is intended for halftone processing in which CMYK tone values of all dots are transformed into values in the density of the corresponding color inks. In this processing, data for driving the print head to deposit the inks on paper, according to the values of density obtained after transformation is generated. The print data generation module 21d receives such data for driving the print head, and under its control, the data is arranged in sequence in which the data is to be used on the printer 40. On the printer 40, an array of ink jet nozzles, not shown, is installed as an ink jet device. In this nozzle array, because a plurality of ink jet nozzles are installed in parallel in the feed direction, data for dots that are separated by a few dots in the feed direction is used simultaneously.

Then, rasterizing is performed, that is, rearranging the data in sequence so that dots data arranged in the scanning direction that are to be used simultaneously will be buffered simultaneously in the printer 40. After the rasterizing, predetermined data such as image resolution is added, and print data is generated that is output to the printer 40 via the parallel communication I/O unit 19b. Based on the print data, the printer 40 prints an image displayed on the display 18.

(2) Print Operation

Print operation to be carried out by the hardware and software configured as above will be explained below, based on a flowchart shown in FIG. 3 and a conceptual diagram of operation shown in FIG. 4. On the screen of the display 18 shown in FIG. 4, an image is displayed under the run of the APL 25; that is, image data 15a stored in the disk on the HDD 15 is read into the RAM and an image therefrom is displayed on the screen, when the computer is receiving user request for executing print operation. In short, under the APL 25, when the image data 15a is read into the RAM 14, image A is presented on the display 18 from the image data 15a under the control of the display DRV 23.

Figure 4:
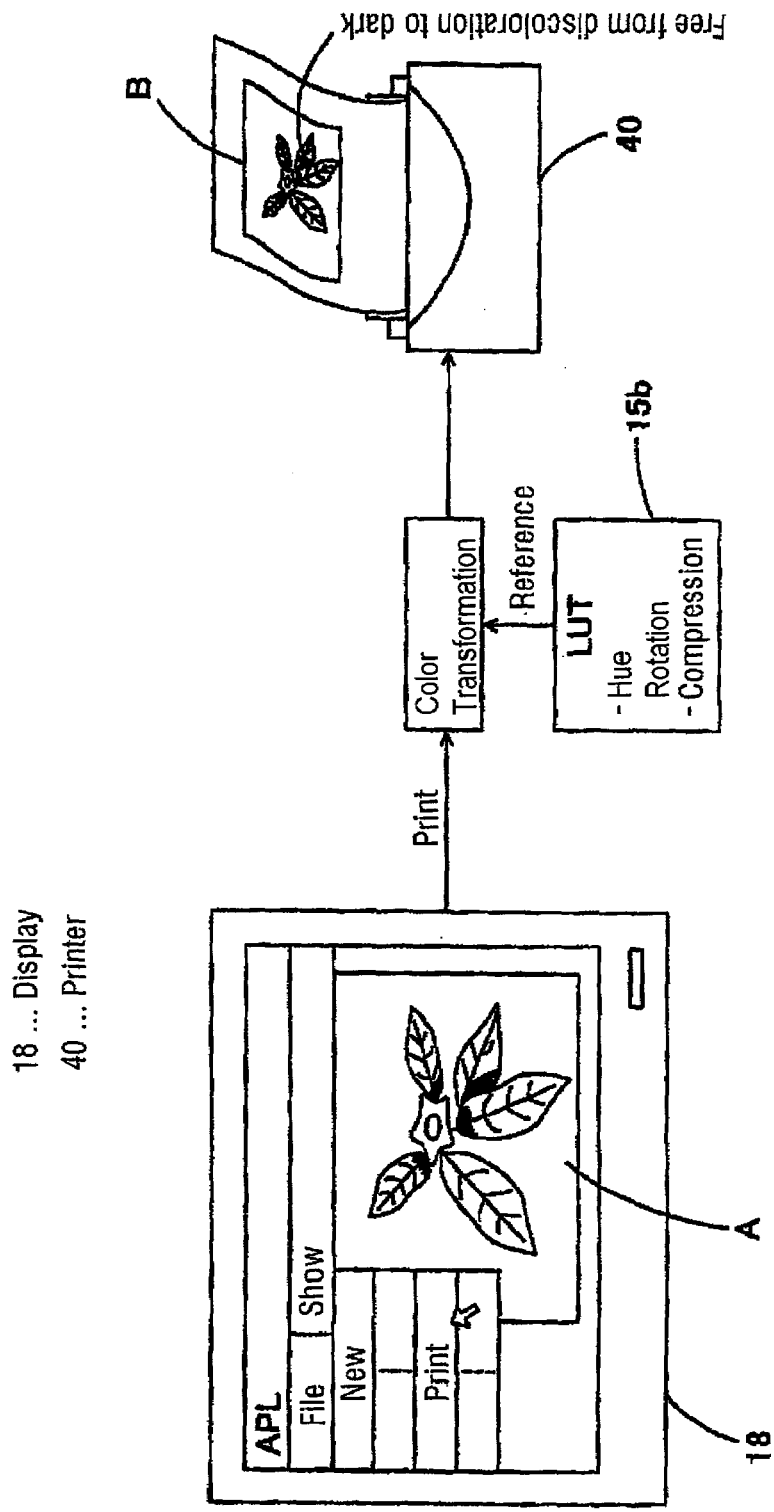
FIG. 4 is a conceptual diagram of operation of the invention.

Image A shown in FIG. 4 is a close-up image of a flow and its leaves captured with a digital camera, wherein the leaves in the middle are mainly green-hued with their overlapped portions shadowed with low-lightness tints of green. The LUT 15b in the present preferred embodiment maintains mapping between RGB data and CMYK data obtained as follows. The color gamut of display 18 is mapped such that a color gamut phase, for example, around the yellow hue to the green hue, is rotated toward the green hue to the cyan hue in the low lightness range, thereby matching it with the color gamut of printer 40, as will be explained later. Thus, an image assuming the hues like image A is suitable for the one to which the invention should be applied. Under the APL 25, the computer reads the data of image A stored in the disk on the HDD 15 into the RAM and presents image A on the display 18. Then, the user can request the computer to execute retouching and other image processing as well as print operation of the image A via the APL.

Request for retouching and print operation can be performed by choosing the appropriate item from the menu presented on the display 18, using the input device such as the mouse 32. On the illustrative screen shown in FIG. 4, the user is issuing the request for executing print operation by using the pointer of the mouse 32. More specifically, using the mouse 32, when the user points the Print item from the menu by the pointer and clicks it with the button of the mouse 32, the request for executing print operation is issued and the image data 15a is handed over to the PRTDRV 21.

Figure 3:
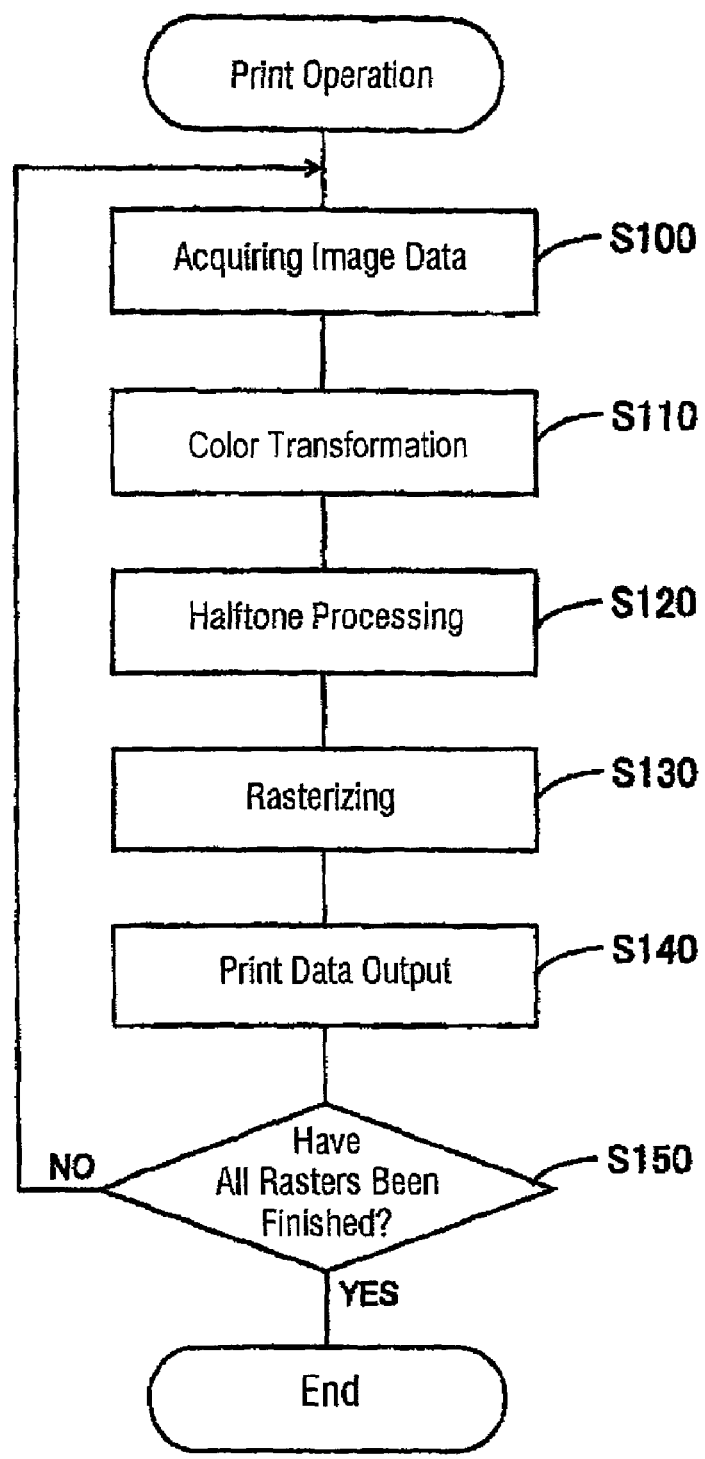
FIG. 3 is a flowchart illustrating print operation.

Once the image data 15a has been handed over to the PRTDRV 21, print operation illustrated in FIG. 3 starts. In step S100, image data 15a of image A is acquired from the RAM 14, where it was stored, under the control the image data acquisition module 21a. Then, the color transformation module 21b is activated and the RGB to CMYK transformation for all dots of the image data 15a is executed in step S110. During this transformation, the color transformation module 21b makes the computer execute interpolation computation while referring to the LUT 15b, thereby generating CMYK data. The LUT 15b contains data created through a process in which, in the color region of the yellow hue to the green hue of low lightness, the color gamut of display 18 is rotated toward the green hue to the cyan hue and compressed, thereby matching with the color gamut of printer 40. In the color gamut of printer 40, colors even in the range of the green hue to cyan hue of low lightness have high chroma to a certain degree. Certain colors in the color gamut of display 18 are mapped through the rotation of their hue (hue angle) to the high-chroma colors during color transformation based on the LUT 15b.

After the color transformation, the dot matrix data obtained is subjected to halftone processing in step S120 under the control of the halftone processing module 21c. Furthermore, the data is subjected to rasterizing in step S130 under the control of the print data generation module 21d. Then, the thus generated print data is output to the printer in step S140 via the parallel communication I/O unit 19b. In step S150, judgment is made as to whether all rasters of the image data 15a have been processed by color transformation and subsequent. Until it has been judged that all rasters have been processed, the steps 100 and subsequent steps are repeated. As a result, the printer 40 prints image B, using the colors obtained after the color transformation. The printed image B is free from discoloration of the color of the leaves in the low-lightness range, that is, the shadowed portions of the leaves look dark brown by contrast with green in the surroundings.

Figure 5:
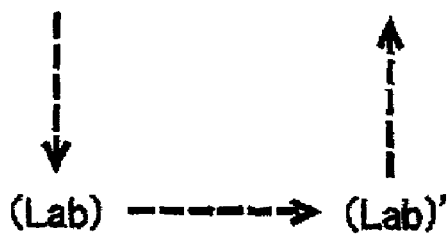
FIG. 5 shows an exemplary lookup table (LUT).

The LUT 15b contains, as is shown in FIG. 5, RGB tone data in compliance with the sRGB standards and corresponding CMYK tone data used on the printer 40 for sample points. In the step S110, the interpolation computation is executed, based on these sample points, thereby mapping any given RGB tone values to CMYK tone values. As the method of interpolation computation, diverse techniques are publicly known and any of them is applicable. In accordance with the invention, the LUT 15b is created by mapping color data in the RGB gamut modified through the processing of hue rotation followed by compression to color data in the CMYK gamut. Thus, color unbalancing that results from compression can be prevented. Next, a process of creating the LUT 15b will be explained.

(3) LUT Creation Process

Figure 6:
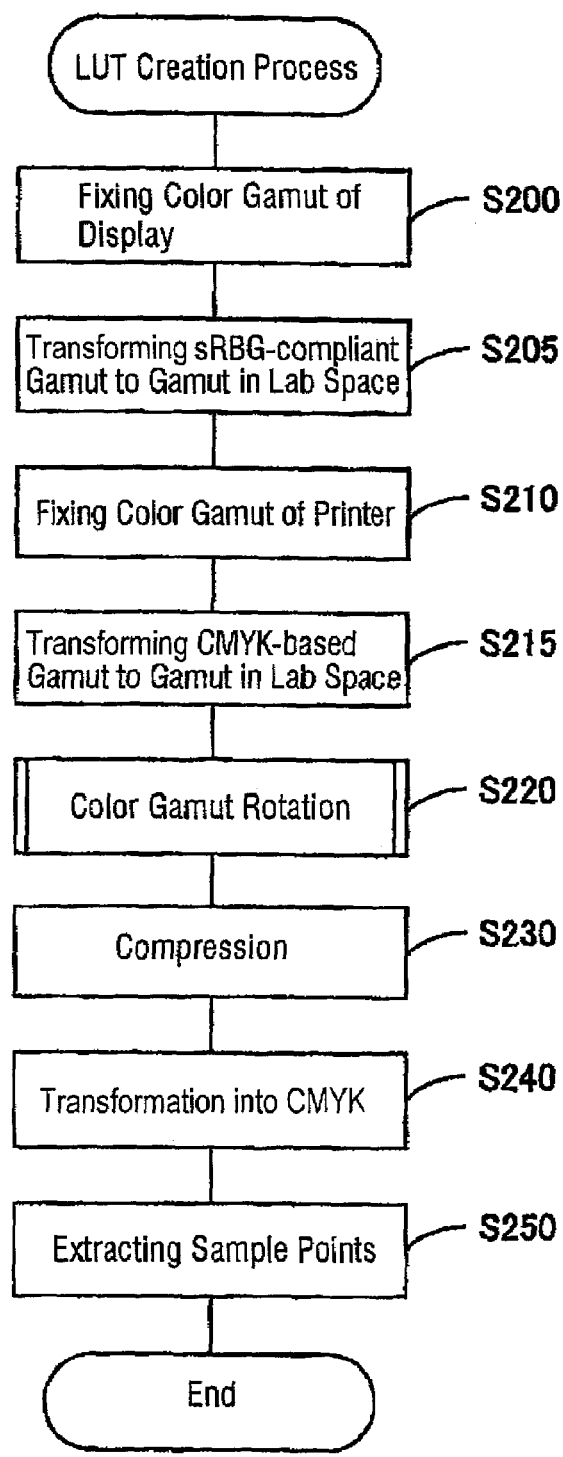
FIG. 6 is a flowchart illustrating the process of creating the LUT.

FIG. 6 illustrates the process flow of creating the LUT 15b. Because this process involves a lot of arithmetic processing, using the computer is desirable to execute arithmetic operation. In the invention, in a certain lightness range and a certain region of hues in the gamut of display, the hue (hue angle) is rotated without actively causing lightness change, and the color coordinate values obtained after the rotation are compressed toward the color gamut of printer 40. Based on the thus resulting gamut, the relationship of color data mapping between RGB and CMYK is defined and set in the LUT 15b. On the assumption of using a Lab (CIELAB) color space, the processing of hue rotation and compression is performed on a plane intersecting axis L at right angles in the Lab space. The processing is performed for a color region where the color gamut of display 18 is far greater than the color gamut of printer 40 and the neighboring color gamut of printer 40 assumes high chroma. In the present preferred embodiment, color values in the range of the yellow hue to the green hue are rotated toward the green hue to cyan hue as described above. Specifically, the processing is performed for the color region of the Lab space where lightness of 50 or less and hue (hue) angles of 40° to 240°. This region of target of processing can be changed, according to the applied device type of display and printer, the image-processing medium used, and the kinds of ink or other colorant used on the printer. Such a manner as to change lightness as the hue rotates is also possible.

Although the LUT 15b is to hold the mapping between RGB values and CMYK values, the processing is performed in the Lab space, which is device-independent color space, to take the color gamut of the display 18 and the color gamut of the printer 40 into account. In step S200, first, the color gamut of display is fixed. In the present preferred embodiment, in the image data 15a, colors are expressed by combinations of the respective 256 tone values of the R, G, and B colors. The color gamut of the display 18 is fixed by taking all combinations of the respective 256 tone values of R, G, and B into account. Because the RGB data is image data in compliance with the sRGB standards as described above, it can be transformed into color values by the coordinates of the Lab space by using a publicly known transformation formula. In step S205, this transformation is performed and the color gamut of the display 18 in the Lab space is fixed.

In step S210, the color gamut of the printer 40 is fixed. In the CMYK tone data for the printer 40, similarly, colors are expressed by combinations of the respective 256 tone values of the C, M, Y, and K colors. Thus, the color gamut of the printer 40 is fixed by taking all combinations of the respective 256 tone values of C, M, Y, and K into account. In step S215, the thus fixed color gamut is transformed into the gamut in the Lab space. Hereon, the printer's color gamut in the Lab space can be fixed by measuring a color patch printed from the above CMYK data with a calorimeter or by reference to the profile of the printer 40. Not only the CMYK tone data, but also CMY data, CMYKlclm data, and CMYK lclmDY data may be applied. It is also possible to fix the printer's color gamut in the Lab space, based on the transformation by means of color separation into color components, using the above-mentioned color data in combination.

After thus fixing the color gamut of display 18 and the color gamut of printer 19 in the Lab space, hue rotation is executed in step S220. The color coordinate values out of the color gamut of printer 40 are compressed toward the center point on the a-b plane in step S230. As the compression method, publicly known diverse methods are applicable and any of them can be adopted. In the hue after being rotated, the color gamut of printer 40 assumes high chroma. Thus, without applying high-rate compression, the obtained color data can be mapped to CMYK data in step S240. For color regions other than the region for which hue rotation is applied, the color data in the RGB gamut can be mapped to color data in the CMYK gamut, according to a publicly known mapping method.

Because the thus produced gamut dot-to-dot corresponds to the original color gamut of display 18, the color data in the resulting gamut is transformed into the CMYK tone values in step S240. Hereon, this transformation is reverse to the transformation performed in the step S215. As a result of this transformation, mapping between the sRGB-compliant data and the CMYK data is set definite. In step S250, the sample points necessary for interpolation computation at color transformation are extracted and their data is set in the LUT 15b.

The LUT 15b is thus built as exemplified in FIG. 5. Apparently, the table contains data representing simple mapping between the sRGB data and the corresponding CMYK data, but this mapping has been obtained through the transition indicated by the dotted lines and arrows below the table. Specifically, the color gamut of display 18 is modified through hue rotation and compression in the Lab space and transfigured to gamut mapping (Lab)' and the color data in the resulting gamut is transformed into CMYK data. After color transformation executed by the color transformation module 21b, consequently, colors according to CMYK data of high chroma are generated. Note that the LUT 15b can be adapted to varieties of devices of display 18 and printer 40, image-processing media, and ink used on the printer 40.

(4) Hue Rotation

Figure 7:
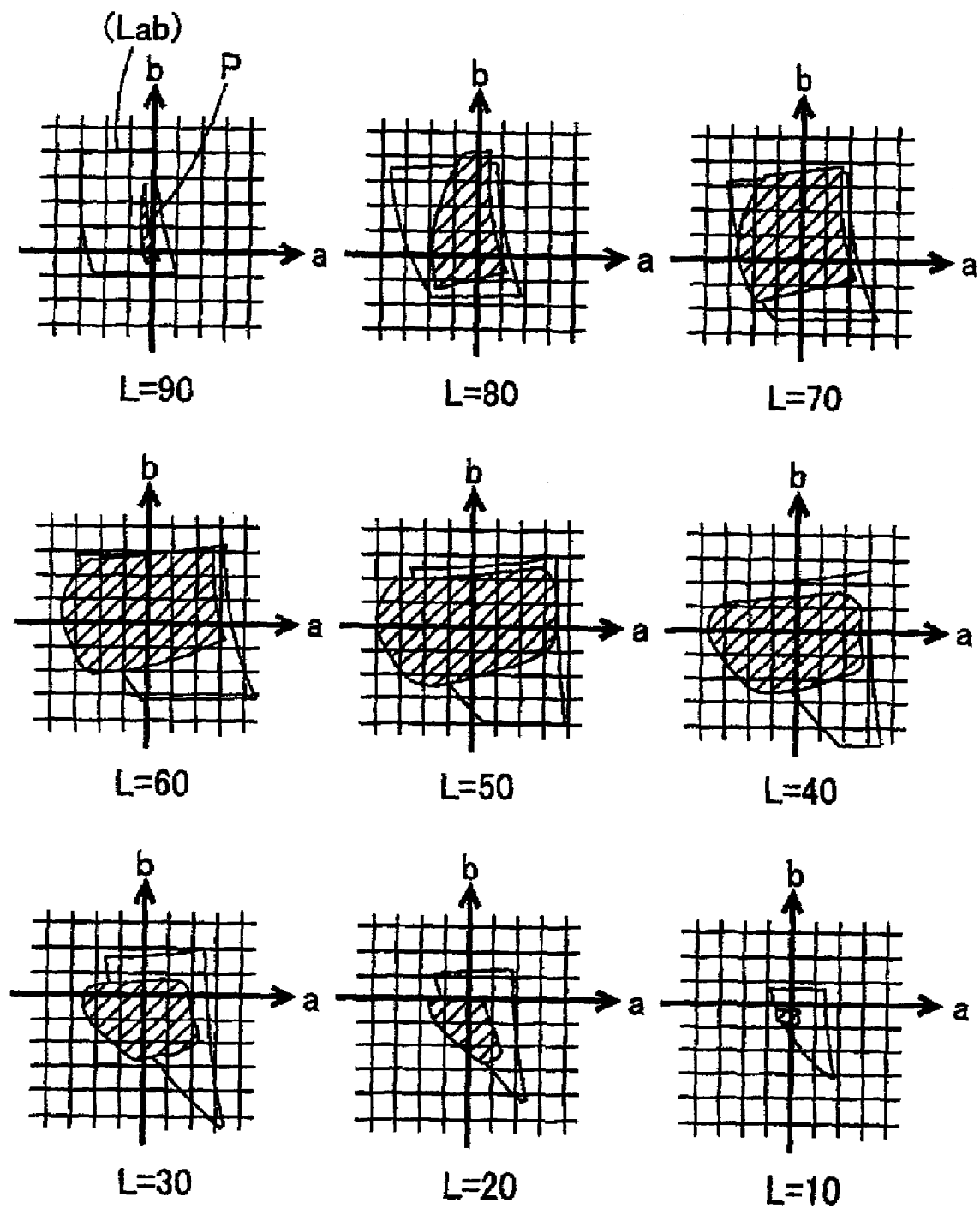
FIG. 7 shows views of color gamut forms on the a-b plane cut in lightness segments in the Lab space.

In this subsection, the hue rotation in the above-mentioned step S220 will be explained in detail. FIG. 7 shows surface views of the color gamut (Lab) of display 18 and the color gamut P of printer 40 on the a-b plane cut in lightness segments in the Lab space. Here, the range of lightness L values "10≦L≦90" is segmented in steps of 10. As shown in FIG. 7, the gamut (Lab) of display 18 gradually becomes smaller as lightness decreases over the medium lightness range (30<L<60) and the low lightness range (0<L 30). On the other hand, the color gamut P of printer 40 rapidly becomes smaller and smaller as lightness decreases in the low lightness range. Especially, in the color region from the red hue through the yellow hue to the green hue, sufficient chroma is not given in the color gamut P of printer 40. In the low lightness range and in the color region from the red hue through the yellow hue to the green hue, the gamut (Lab) of display 18 is greater than the color gamut P of printer. However, in the color region around a hue angle of 180°, the color gamut P of printer is greater than the color gamut (Lab) of display 18. Thus, as described above, the region of the yellow hue to the green hue in the low lightness range is rotated counterclockwise.

In the present preferred embodiment, rotational displacement is defined by a parameter that varies, depending on the hue angle of a coordinate point from where to rotate and a parameter that varies, depending on the lightness value of a coordinate point from where to rotate. When predetermined conditions of judgment are satisfied, rotational displacement $\Delta\theta$ is determined by using the following equation (1).

[Equation 1]

$$\Delta\theta = \Delta\theta\max * f(\theta) * g(L) \quad (1)$$

where, f ($\theta$) is a rotational displacement coefficient that depends on the hue angles and g (L) is a rotational displacement coefficient that depends on lightness change, $\Delta\theta$max is maximum rotational displacement that is properly determined, according to the shape of the color gamut (Lab) of display 18 and the color gamut P of printer 40.

Figure 8:
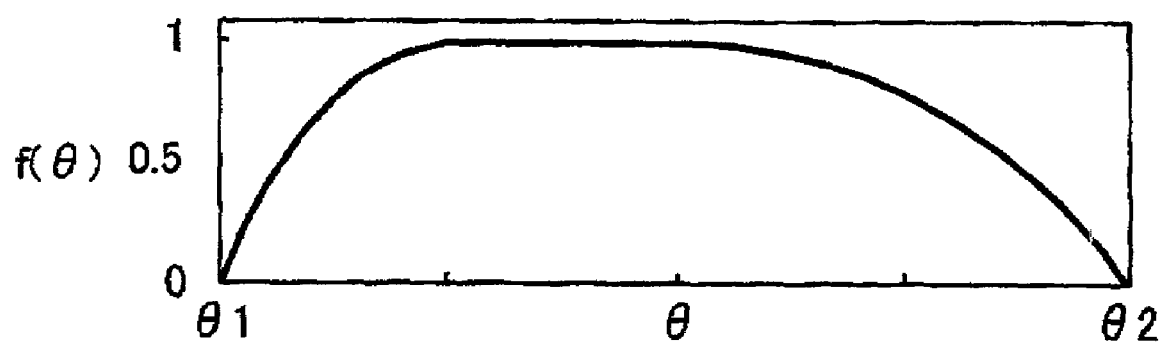
FIG. 8 shows how a rotational displacement coefficient f (θ) varies, depending on hue angles.

The rotational displacement coefficient f ($\theta$) assumes a finite value that varies within the range of "$\theta 1 \leq \theta \leq \theta 2$" as is shown in FIG. 8. As the hue angle increases from $\theta 1$, the rotational displacement coefficient f ($\theta$) gradually rises from 0 to 1 and keeps at 1 in a given range of hue angles between $\theta 1$ and $\theta 2$. The dependence of the rotational displacement coefficient f ($\theta$) on the hue angles reflects the color gamut shapes of both image processing devices in the range of lightness L 10 to 30 shown in FIG. 7. In this range, in the first and second quadrants of the a-b plane, a region exists where the color gamut (Lab) of display 18 is greater than the color gamut P of printer 40. In the third and fourth quadrants of the a-b plane, a region exists where the color gamut P of printer 40 is greater than the color gamut (Lab) of display 18.

Figure 9:
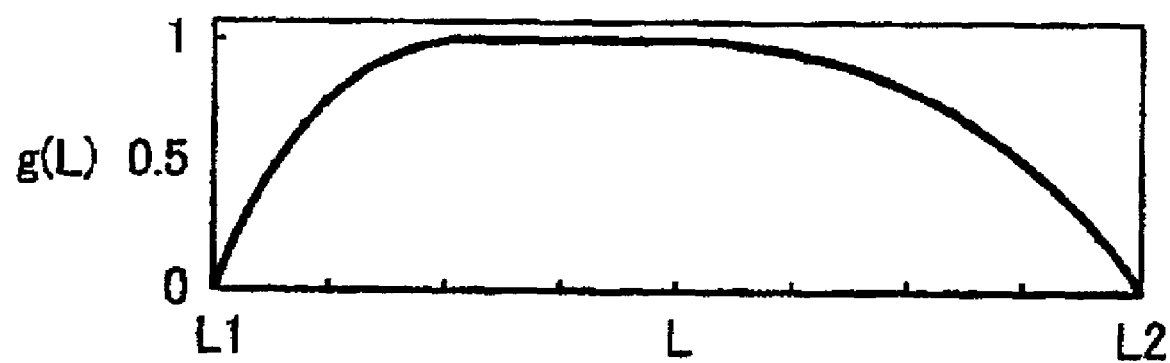
FIG. 9 shows how a rotational displacement coefficient g (L) varies, depending on lightness change.

The rotational displacement coefficient g (L) assumes a finite value that varies within the range of "L1≦L≦L2" as is shown in FIG. 9. As lightness increases from L1, the rotational displacement coefficient g (L) gradually rises from 0 to 1. As lightness decreases from L2, the rotational displacement coefficient g (L) gradually rises from 0 to 1. In a given range of lightness between L1 and L2, the rotational displacement coefficient g (L) keeps at 1. The dependence of the rotational displacement coefficient g (L) on lightness reflects the color gamut shapes of both image processing devices in the range of lightness L of 0 to 40. In this range, a region exists where the color gamut (Lab) of display 18 is greater than the color gamut P of printer 40 and another region exists adjacently where the color gamut P of printer 40 is greater than the color gamut (Lab) of display 18.

The above conditions of judgment are the criterions for judging whether or not the hue rotation in accordance with the invention is effective; in the present preferred embodiment, they are the following constraints (2), (3), and (4):

[Constraints]

$$\frac{m}{m+n} > \alpha \quad (2)$$

$$n < \beta \quad (3)$$

$$\frac{n'}{n} > \gamma \quad (4)$$

where, on the assumption that a given coordinate point F in the color gamut (Lab) is compressed to fall within the color gamut of printer 40 without being displaced by hue rotation, distance between the coordinate point F before being compressed and the center point O of the a-b plane is m+n and distance of the coordinate point F' after being compressed and the center point O of the a-b plane is n. On the assumption that, by rotating the hue angle of the coordinate point F by $\theta$ counterclockwise, the coordinate point F moves to a coordinate point G, distance between the coordinate point G and the center point O of the a-b plane is m'+n' and distance of a coordinate point G' obtained after the coordinate point G is compressed to fall within the color gamut of printer 40 and the center point O of the a-b plane is n'. $\alpha$, $\beta$, and $\gamma$ are predetermined threshold values.

In this embodiment, compression is applied, according to a compression method commonly used in general color gamut mapping. In the Lab space, the coordinate points in the color gamut of the first image processing device are moved toward the center point O of the a-b plane so that they will mapped as the corresponding coordinate points in the color gamut of the second image processing device. The highest chroma point of the color gamut of the first image processing device in a certain hue is moved to the highest chroma point of the color gamut of the second image processing device in a certain hue and other coordinate points are moved, depending on the distance from the center point O. In this way, the color coordinate values in the color gamut of the first image processing device are mapped to color coordinate values in the color gamut of the second image processing device.

Figure 10:
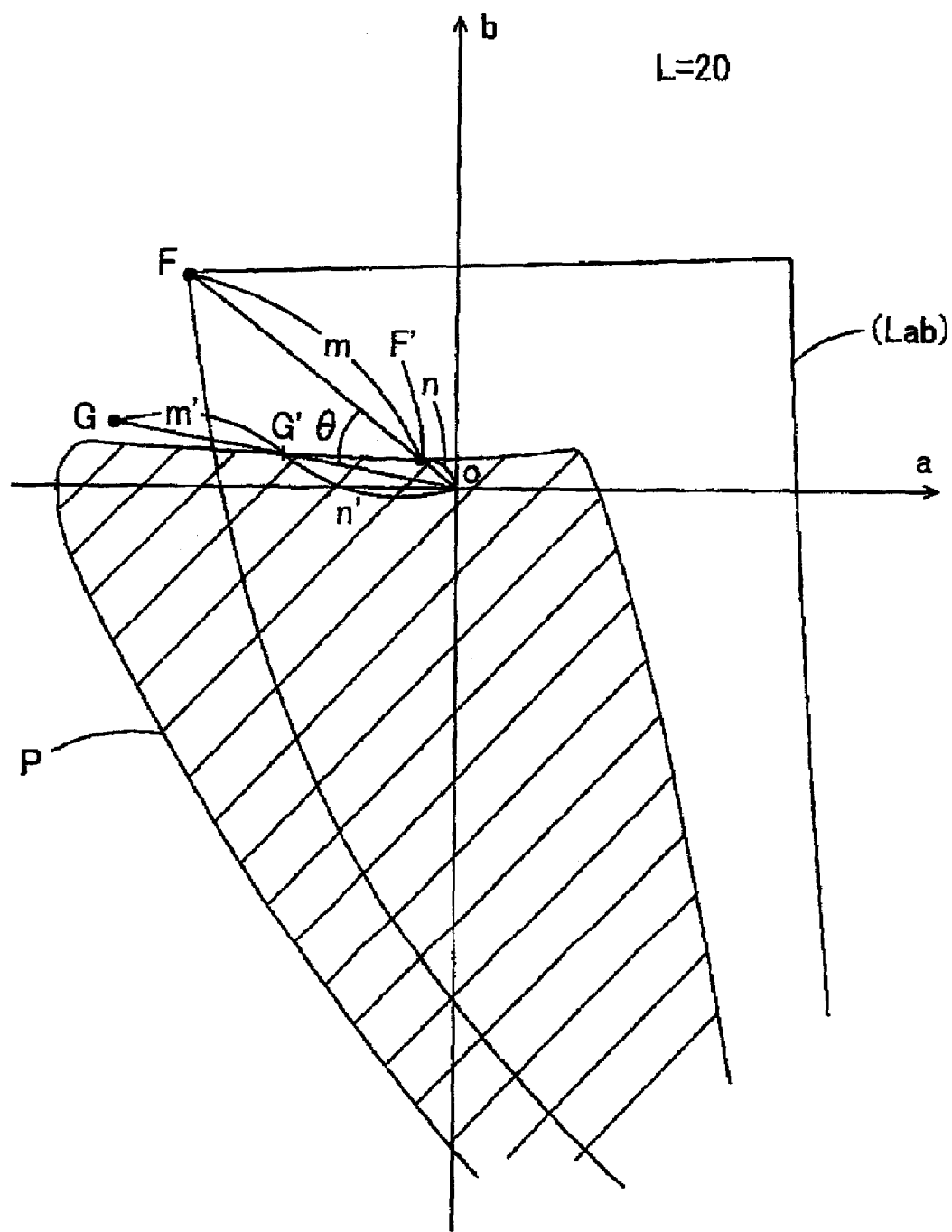
FIG. 10 shows mapping of color gamut forms on the a-b plane for explaining judgment by constraints.

Refer to FIG. 10. For example, assume that a vertex of the color gamut (Lab) of display 18 in the second quadrant is coordinate point F, a point to which the coordinate point F moves by rotating by hue angle θ is coordinate point G. Because the coordinate point F is on the top edge of the color gamut (Lab) of display 18, it ought to move to a point on the top edge of the color gamut P of printer when being compressed. Thus, the coordinate point F is compressed and moves to coordinate point F' when its hue angle is not rotated. When its hue angle is rotated, then the coordinate point G is compressed and moves to coordinate point G'. When the above judgement is made for the coordinate point F, O-F' distance is assigned to n, O-F distance is assigned to m+n, O-G distance is assigned to m'+n', and O-G' distance is assigned to n'.

According to the foregoing constraint (2), judgment is made as to whether the compression rate when hue rotation is not applied is greater than predetermined threshold α. By this judgment, if the compression rate is greater than threshold α, hue rotation is applied, so that excessive compression, critical cause of color unbalancing, can be prevented. According to the foregoing constraint (3), judgment is made as to whether the absolute chroma obtained after compression when hue rotation is not applied is smaller than predetermined threshold β. If the absolute chroma is smaller than the threshold β, hue rotation is applied, so that compression to extremely low chroma at which color unbalancing is liable to occur can be prevented.

According to the foregoing constraint (4), comparison is made between the absolute chroma obtained after compression when hue rotation is applied and the absolute chroma when hue rotation is not applied. Subject to the constraint (4), if n'/n is greater than threshold γ, which indicates that hue-rotation angle θ by which the coordinate point F is rotated to the coordinate point F falls with the range of "–45°<θ<45°," hue rotation is applied. Consequently, a hue-rotation angle for giving a sufficiently high chroma can be determined. As the threshold γ, any of diverse values can be used, according to the shapes of the color gamut (Lab) of display 18 and the color gamut P of printer 40 and a sufficient degree of chroma required after compression. Generally, using a value range of 1.3 to 1.5 produces good result.

Figure 11:
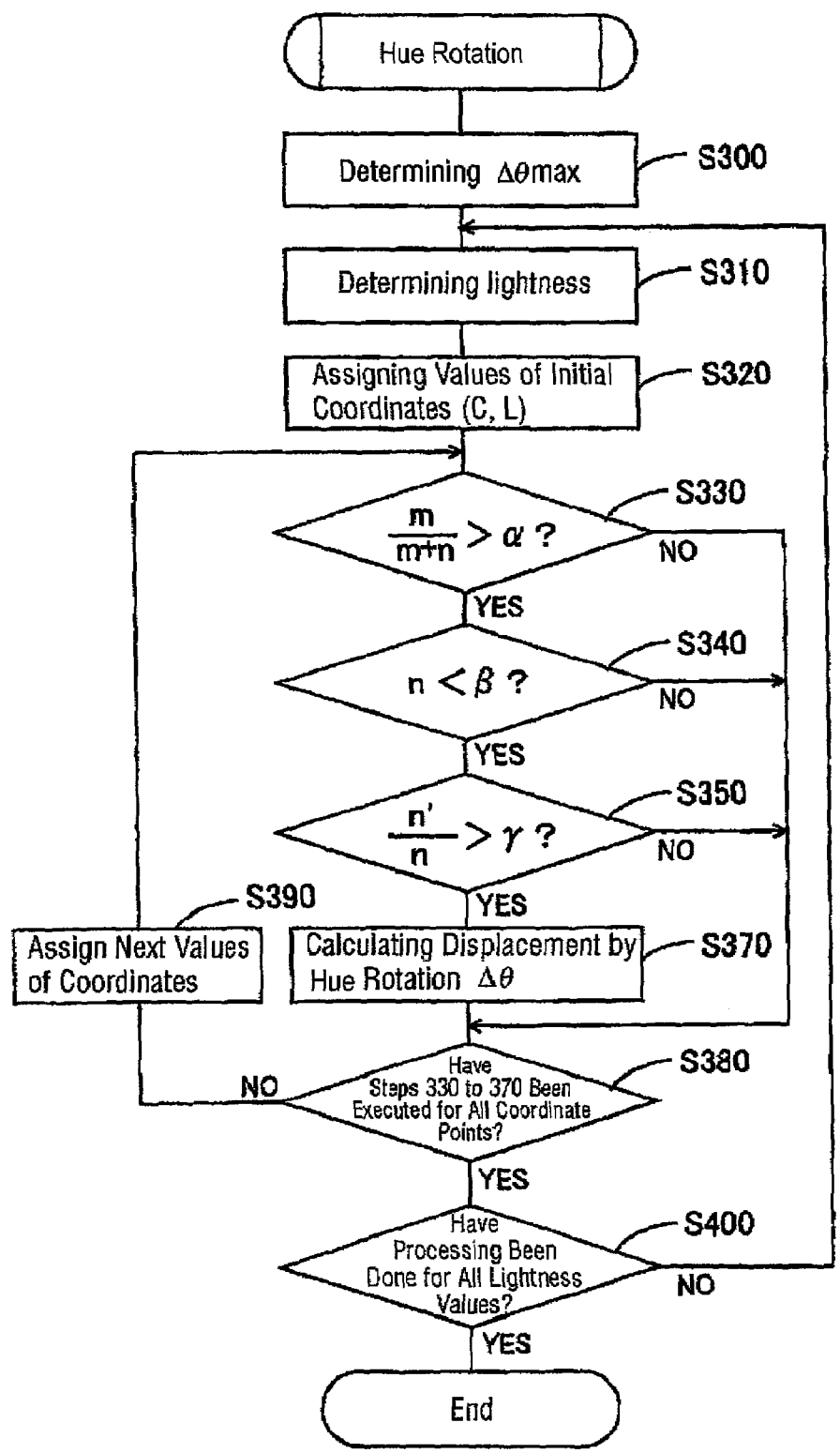
FIG. 11 is a flowchart illustrating the processing of hue rotation.

FIG. 11 is a flowchart illustrating the processing of hue rotation using the foregoing equation (1) and constraints (2). Referring to FIG. 11, at the first step S300, maximum rotational displacement Δθmax of coordinate points in the color gamut (Lab) of display 18 is determined. In the next step S310, lightness for which hue rotation is executed is determined. In the present preferred embodiment, the lightness range of "0 to 40" is set as the target of processing; in this range, the rotational displacement coefficient g (L) varies, depending on lightness change. The processing of hue rotation is carried out for predetermined lightness values sequentially from 0.

Figure 12:
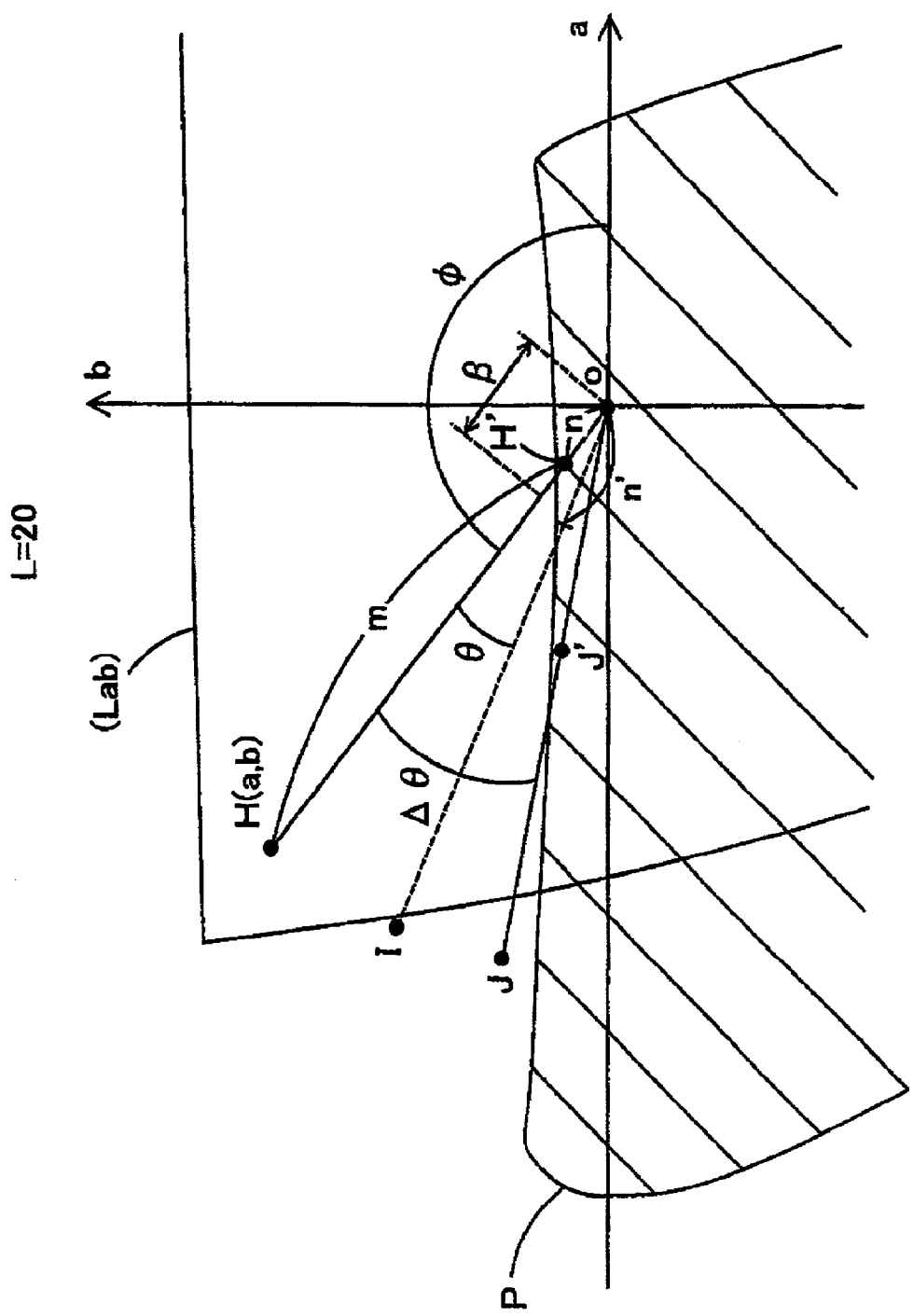
FIG. 12 shows mapping of color gamut forms on the a-b plane for explaining judgment by constraints and hue rotation followed by compression

In step S320, values of initial coordinates (a, b) are assigned in the hue of target of processing. In step S330 and subsequent, the judgments by the constraints are executed. FIG. 12 illustrates how the judgments by the constraints are executed for coordinate point H (a, b) with lightness L=20. In step S330, O-H distance as m+n, that is, chroma C of the coordinates point H (a, b) is calculated, and on the assumption that coordinate point H' is a point to where the coordinate point H moves when being compressed toward the color gamut P of printer 40, O-H' distance as n is calculated. Then, judgment by the constraint (2) is executed. By the judgment in step S330, if the compression rate is not greater than threshold α, not fulfilling the constraint (2), it is determined that hue rotation is not applied for the coordinate point and step 380 and subsequent are carried out.

By the judgment in step S330, if the compression rate is greater than threshold α, fulfilling the constraint (2), judgment by the constraint (3) is executed in step S340. By the judgment in step S340, if the absolute chroma is not smaller than threshold β, not fulfilling the constraint (3), it is determined that hue rotation is not applied for the coordinate point and step 380 and subsequent are carried out. By the judgment in step S340, if the absolute chroma is smaller than threshold β, fulfilling the constraint (3), judgment by the constraint (4) is executed in step S350. When a value of β is determinative, as shown in FIG. 12, it is judged that the absolute chroma n is smaller than threshold β during the process about the coordinate point H (a, b).

In the step S350, on the assumption that the coordinate point H rotates by predetermined hue angle θ and moves to coordinate point I, absolute chroma n' to be obtained when the coordinate point I is compressed to fall within the color gamut P of printer 40 is calculated. Then, judgment is made as to whether the ratio of this absolute chroma to the absolute chroma determined in step S340 is greater than threshold γ, according to the constraint (4). By the judgment in step S350, if the ratio is not greater than threshold γ, it is determined that hue rotation is not applied for the coordinate point and step 380 and subsequent are carried out. By the judgment in step S350, if the ratio is greater than threshold γ, displacement by hue rotation Δθ is calculated in step S370. A value range of 1.3 to 1.5 is generally assigned to threshold γ as described above, and the ratio n'/n exceeds the range of 1.3 to 1.5 in the illustrative case shown in FIG. 1, thus, the positive judgment is made in the step S350.

In the step S370, values of the parameters in the foregoing equation (1) are determined and displacement by hue rotation Δθ is calculated. Hereon, a hue angle that is a variable to be assigned to the rotational displacement coefficient f (θ) is that of the coordinate point from where to rotate and it is angle φ in the illustrative case shown in FIG. 12. Because the function curve of the rotational displacement coefficient f (θ) is defined as shown in FIG. 8, its value is determined by rotational displacement coefficient f (φ). A lightness value that is a variable to be assigned to the rotational displacement coefficient g (L) is also that of the coordinate point from where to rotate and L=20 in the illustrative case shown in FIG. 12. Because the function curve of the rotational displacement coefficient g (L) is defined as shown in FIG. 9, its value is determined by rotational displacement coefficient g (20). After the values of the parameters are determined in this way, displacement by hue rotation Δθ is calculated. In the illustrative case shown in FIG. 12, displacement by rotation of the coordinate point H is determined to be angle Δθ by which the coordinate point H moves and reaches the coordinate point J.

Once displacement by hue rotation Δθ of the coordinate point H has been calculated in this way or it has been determined that hue rotation is not applied in any of the steps S330 to S350, judgment is made as to whether the judgments by the constraints and the determination of displacement by hue rotation Δθ have been made for all coordinate points with the currently set lightness value for the target of processing. This judgment is made for all coordinate points in the gamut, wherein it is sufficient to select the necessary and sufficient number of points for creating the LUT 15*b*, because the color gamut shift is one step of creating the LUT 15*b*. Such points can be selected in several manners; for example, calculation is executed for only points given by integer values of coordinates or the Lab color space is latticed with predetermined pitches and calculation is executed for only the lattice points.

By the judgment in step S380, unless the judgments by the constraints and the determination of displacement by hue rotation Δθ have been made for all coordinate points, the next values of coordinates (a, b) are assigned in step S390 and the step S330 and subsequent are repeated. When it has been judged that the judgments and determination have been made for all coordinate points in step S380, judgment is made as to whether the processing of hue rotation has been done for all lightness values in step 400. Until it has been judged that the processing of hue rotation has been done for all lightness values, the step S310 and subsequent are repeated. By executing the calculation described above, displacement by hue rotation Δθ can be obtained for all coordinate values.

After the processing of hue rotation is carried out in this way, compression in the above-mentioned step S230 in FIG. 6 is executed so that the color gamut (Lab) of display 18 will fall within the color gamut P of printer 40. Consequently, in the illustrative case shown in FIG. 12, the coordinate point J is compressed and moves to coordinate point J' and coordinate points, not shown, for which hue rotation is not applied, are also compressed and move to coordinate points the color gamut P. Eventually, the above-mentioned gamut (Lab)' is generated. As a result, all coordinate points in the color gamut (Lab) of display 18 are mapped to any of the coordinate points within the color gamut P of printer 40. Based on this relationship between gamuts, the LUT 15*b* can be created.

By looking through the mapping between the sRGB data and the CMYK data in the created LUT 15*b*, it is seen that the sRGB data at the coordinate point H shown in FIG. 12 is mapped to the CMYK data at the coordinate point J'. From the table data, however, it is not apparent that hue rotation and compression have been executed. In fact, the color at the coordinate point H and the color at the coordinate point exist at different angles of hue; that is, the hue rotates. By comparing the color at the coordinate point H' obtained when hue rotation is not applied and the color at the coordinate point J', the absolute chroma of the color at the coordinate point J' is higher.

Figure 13:
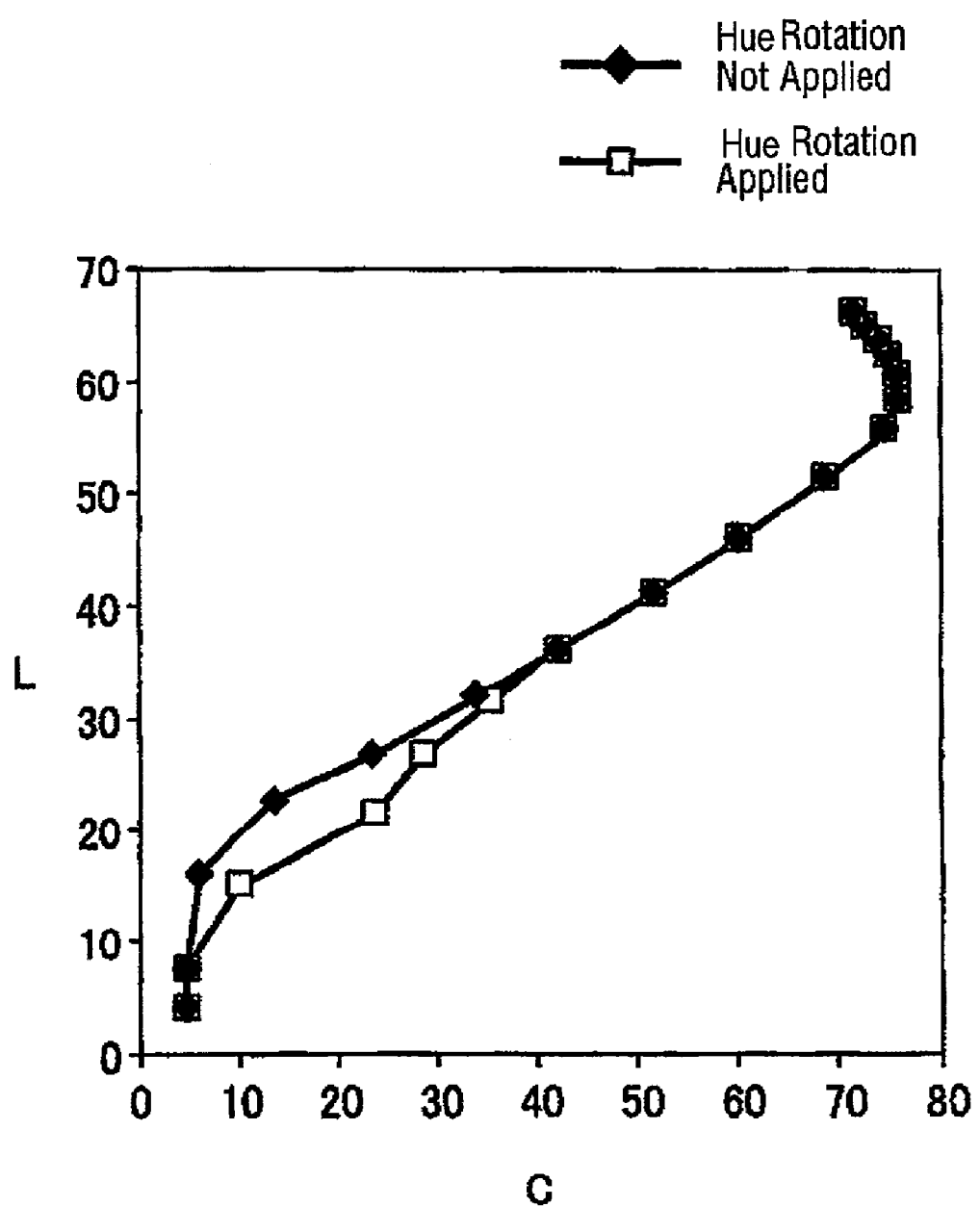
FIG. 13 shows a graph on the L-C plane, plotting the chroma of colors to which certain colors in the direction of the green hue are transformed.

This tendency is true for colors in a certain hue range in the Lab space. FIG. 13 shows a graph for comparison in terms of the chroma of colors to which certain colors in the direction of the green hue are transformed by referencing the LUT between the colors obtained by reference to the LUT 15*b* of the invention and the colors obtained by reference to the LUT created without the application of hue rotation. This graph shows the color values on a plane that intersects axis L at right angles and along the axis L in the Lab space, where lightness L is plotted on the ordinate and chroma C is plotted on the abscissa. In this graph, coordinate points after color transformation with regard to the highest chroma point of the color gamut (Lab) of display 18 are plotted on the L-C plane. Coordinate points marked □ are those after color transformation by reference to the LUT 15*b* of the invention and coordinate points marked ♦ are those after color transformation by reference to the LUT created without the application of hue rotation.

As apparent from this graph, the chroma of the coordinate points obtained by reference to the LUT 15*b* of the invention is higher than the coordinate points obtained without the application of hue rotation in the low lightness range. The difference in chroma between both is greatest around lightness of 20. As lightness rises or falls from the lightness of 20, the difference in chroma smoothly decreases to 0. This fact that the greatest difference in chroma lies in the low lightness range and smoothly decreases with lightness change is attributed to that the rotational displacement coefficient g (L) varies, following the function curve shown in FIG. 9.

Figure 14:
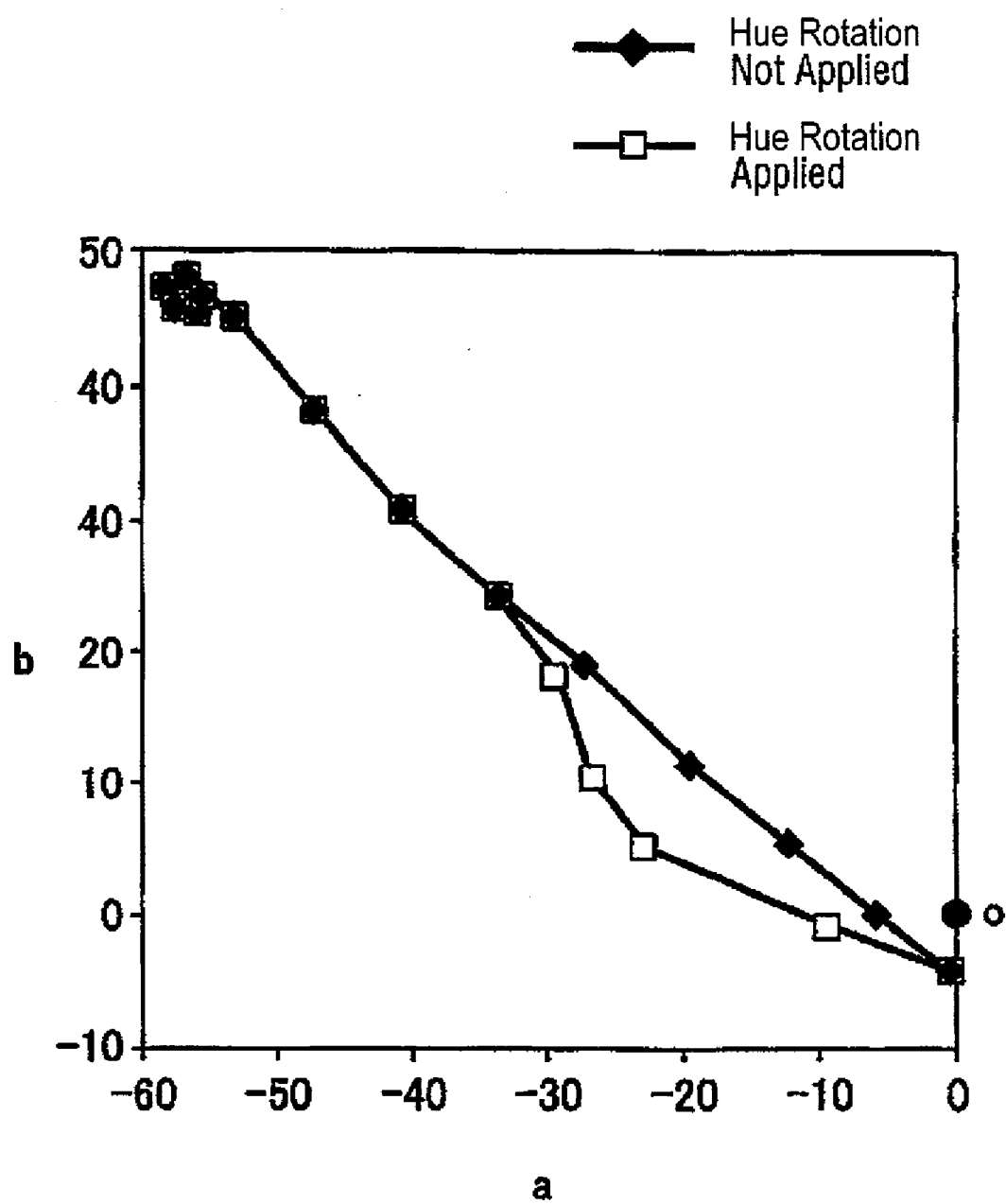
FIG. 14 shows a graph on the a-b plane, plotting the displacement by hue rotation of colors to which certain colors in the direction of the green hue is transformed.

FIG. 14 shows a graph for comparison in terms of the hue of colors to which certain colors in the direction of the green hue are transformed by referencing the LUT between the colors obtained by reference to the LUT 15*b* of the invention and the colors obtained by reference to the LUT created without the application of hue rotation. This graph shows the color values on the a-b plane in the Lab space, where coordinate points after color transformation with regard to the highest chroma point of the color gamut (Lab) of display 18 are plotted on the a-b plane. Similarly, coordinate points marked □ are those after color transformation by reference to the LUT 15*b* of the invention and coordinate points marked ♦ are those after color transformation by reference to the LUT created without the application of hue rotation.

As apparent from this graph, for the coordinate points obtained by reference to the LUT 15*b* of the invention, the hue of certain colors is rotated counterclockwise. The graph section indicating such hue rotation corresponds to the graph section in FIG. 13 showing the difference in chroma between the coordinate points ♦ and the coordinate points □. In the low chroma range, the displacement by hue rotation is 0° and increases up to the greatest as the chroma rises and then decreases to 0° as chroma further rises. This fact that the greatest displacement by hue rotation occurs at a certain lightness and smoothly decreases with lightness change is attributed to that the rotational displacement coefficient f (θ) varies, following the function curve shown in FIG. 8 and that the rotational displacement coefficient g (L) varies, following the function curve shown in FIG. 9.

(5) Preferred Embodiment 2

Figure 15:
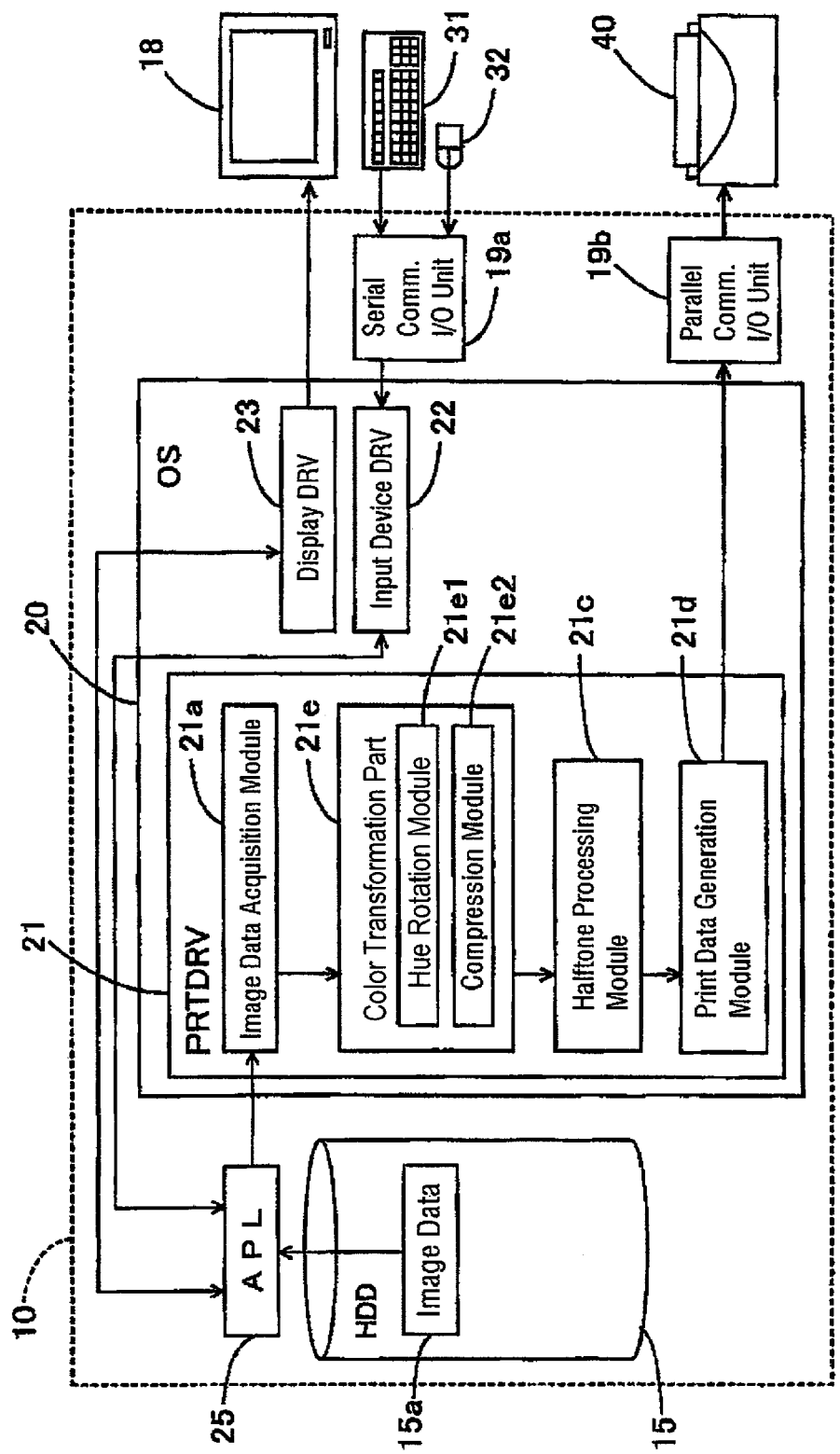
FIG. 15 is a block diagram showing the simplified structure of the OS and related components wherein the color transformation program is provided as a color transformation part in accordance with another preferred embodiment of the invention.

For print operation in the preferred embodiment, the color transformation module 21*b* of the PRTDRV 21 makes the computer execute color transformation by reference to the LUT 15*b* that maintains the data reflecting the processing result of hue rotation and compression. In this embodiment, by using the LUT 15*b* arranged for color transformation, print operation be programmed such that the processing of hue rotation and compression need not be executed each time color transformation is executed. In another preferred embodiment, print operation may be programmed such that the processing of hue rotation and compression is executed during the color transformation process. FIG. 15 shows the simplified structure of the OS and related components wherein the processing of hue rotation and compression is executed under the PRTDRV 21.

In the structure shown in FIG. 15, which is nearly the same as that shown in FIG. 2, the PRTDRV 21 includes a color transformation part 21*e* instead of the color transformation module 21*b*. The color transformation part 21*e* consists of a hue rotation module 21*e*1 and a compression module 21*e*2. The hue rotation module 21*e*1 makes the computer execute the hue rotation processing and the compression module 21*e*2 makes the computer execute the compression processing. Specifically, when RGB data in compliance with the sRGB standards is acquired under the control of the image data acquisition module 21*a*, the color transformation part 21e makes the computer transform the RGB data into Lab data, determine its color domain, and determine the color gamut of printer 40 in the applied hue in the Lab space, based on the ICC profile of the printer 40.

Then, the hue rotation module 21e1 makes the computer execute the steps S330 to S370 in FIG. 11 per dot of the RGB data and determine displacement by hue rotation Δθ per dot. Moreover, the compression module 21e2 makes the computer execute the step S230 in FIG. 6 in which the hue of the dot, after rotated by Δθ, is compressed toward the center of the a-b plane. In consequence, color data on the compressed gamut of display in the Lab space is obtained and the resulting color data is transformed into CMYK data according to the ICC profile of the printer 40. The CMYK data is handed over to the halftone processing module 21c.

In this way, it is also possible to make the computer 10 execute the processing of hue rotation and compression as well as color transformation when making the printer print a certain image. According to this preferred embodiment 2, during color gamut mapping for a certain hue and lightness range, color data with sufficient chroma is obtained and the computer enables the printer to print color images, preventing color unbalancing. In Embodiment 2, the computer must execute the processing of hue rotation and compression for color transformation, but need not execute the interpolation processing. As an alternative to the embodiment in which the color transformation module 21b and color transformation part 21e are installed in the computer that operates separately from the printer 40, it is also possible to provide the printer 40 with the color transformation module 21b and color transformation part 21e as its internal functions.

(6) Preferred Embodiment 3

Figure 16:
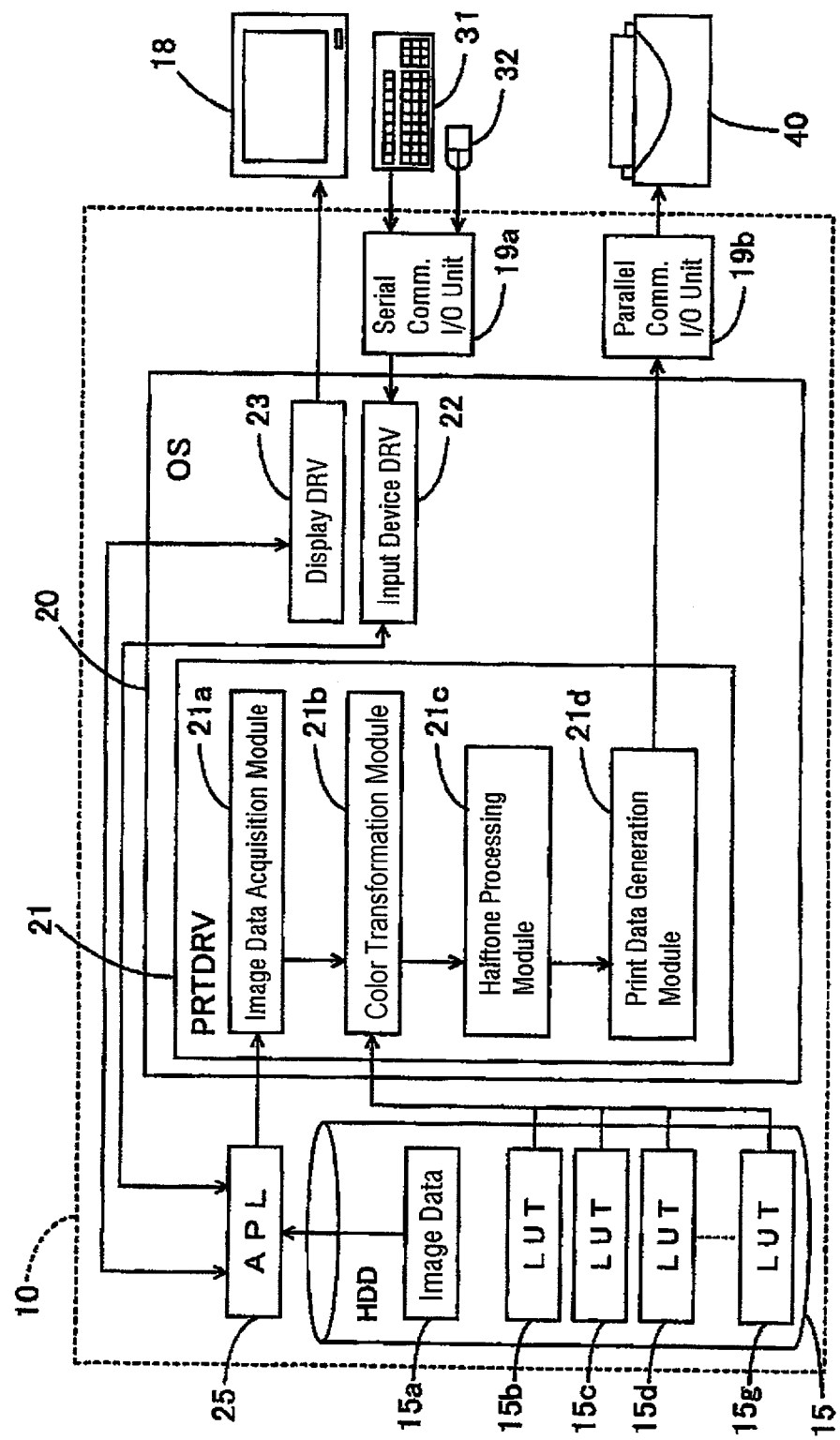
FIG. 16 is a block diagram showing the simplified structure of the OS and related components wherein the color transformation program is provided as the color transformation module, according to a preferred embodiment 3.

The color gamut of printer 40 changes when change is made to the device type of the printer 40, image-processing medium, and ink used on the printer. Thus, it is desirable to arrange the LUTs for the possible varieties of printer type, image-processing medium, and ink on the printer 40 as noted above. FIG. 16 shows the simplified structure of the OS and related components wherein different LUTs can be used for different image-processing media and ink sets used on the printer 40 under the PRTDRV20. In the structure shown in FIG. 16, which is nearly the same as that shown in FIG. 2, a plurality of LUTs are provided so that the color transformation module 21b of the PRTDRV21 will select and use an appropriate LUT for reference, according to the print condition setting performed in advance.

Specifically, the PRTDRV 21 includes a module not shown that can receive the status of printer 40 via the parallel communication I/O unit 19b and determines what ink set is in use, based on the status. The module also determines what image-processing medium is in use, based on the image-processing medium selected by the user, using a Printer Properties window which is not shown. These methods of ink set and image-processing medium determination are illustrative. Means for allowing the user to select a desirable ink set may be used or the printer 40 may be provided with an image-processing medium determination mechanism by which the image-processing medium in use is automatically recognized.

In the disk storage on the HDD 15 shown in FIG. 16, LUTs 15b to 15g are stored whose contents are different for different combinations of image-processing medium and ink set. In Embodiment 3, two kinds of ink sets can be used on the printer 40: one ink set consisting of six colors: cyan (C), magenta (M), yellow (Y), black (K), light cyan (lc), and light magenta (lm); the other consisting of seven colors: cyan (C), magenta (M), yellow (Y), black (K), light cyan (lc), light magenta (lm), and dark yellow (DY). With each ink set, three kinds of image-processing media can be used: photo1 (glossy paper), photo2 (glossy paper), and plain paper. Accordingly, six LUTs are prepared beforehand. Of course, the usable ink sets and image-processing media are not limited to those mentioned above and the number of LUTs is not limited to six.

These LUTs are arranged for six printer's color gamuts as determined by combination of image-processing medium and ink set. Because the color gamut of printer fixed in the step S210 in FIG. 6 varies for each combination of image-processing medium and ink set, the CMYK data obtained by the result of processing in the step S220 differs, and consequently, different LUTs are created. FIG. 17 shows a table listing symbolic values of parameters given for each combination of ink set and image-processing medium, which are used for hue rotation, according to the printer's color gamut that is mapped as the target gamut of color output.

In FIG. 17, the ink set consisting of six colors is assumed to be ink set A and the ink set consisting of seven colors ink set B. As shown, the LUT for paper photo1 combined with ink set A is LUT 15b, the LUT for paper photo2 combined with ink set A is LUT 15c, and the LUT for plain paper combined with ink set A is LUT 15d. The LUT for paper photo1 combined with ink set B is LUT 15e, the LUT for paper photo2 combined with ink set B is LUT 15f, and the LUT for plain paper combined with ink set B is LUT 15g.

In Embodiment 3, the printer' color gamut changes in size, according to the type of paper on which to print images; that is, its gamut is large when photo1 is used, medium when photo2 is used, and small when plain paper is used with either ink set. Generally, the larger the color gamut, the smaller will be the displacement by hue rotation. The LUTs 15b to 15g are created, based on the parameter values that are properly selected to be used in the processing of hue rotation to make the displacement by hue rotation suitable for the color gamut shape that is predetermined for each combination of ink set and paper.

The maximum rotational displacement Δθmax which is a parameter for use in the processing of hue rotation is set smaller for greater color gamut. As concerns the symbolic values of this parameter shown in FIG. 17, actual values are assigned to this parameter, subject to constraints: Δθ1max<Δθ2max<Δθ3max and Δθ3max<Δθ4max=Δθ4max. With regard to the rotational displacement coefficient f (θ) and the rotational displacement coefficient g (L), for greater color gamut, their value ranges are reduced or their values are assigned to reduce the displacement by hue rotation in the function form. However, all parameters are not necessarily set different for color gamuts. In FIG. 17, as the maximum rotational displacement, a common parameter value Δθ3max is used for creating LUTs 15d and 15e and a common parameter value Δθ4max is used for creating LUTs 15f and 15g. As the rotational displacement coefficient, a common function value g2 (L) is used for creating LUTs 15c and 15e and a common function value g3 (L) is used for creating LUTs 15d and 15f.

Figure 18:
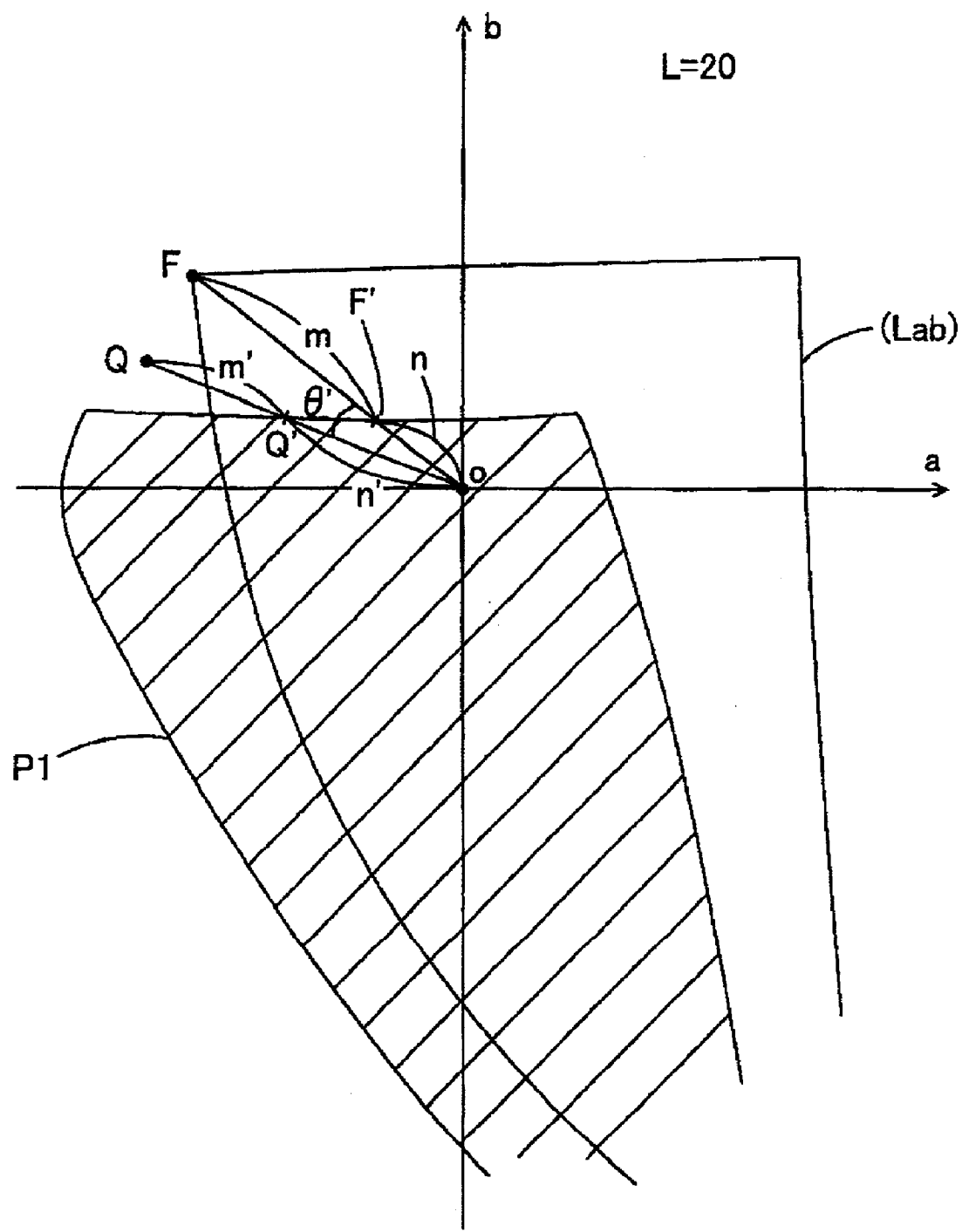
FIG. 18 is gamut mapping illustration for explaining different values of parameters assigned for each color gamut.
Figure 19:
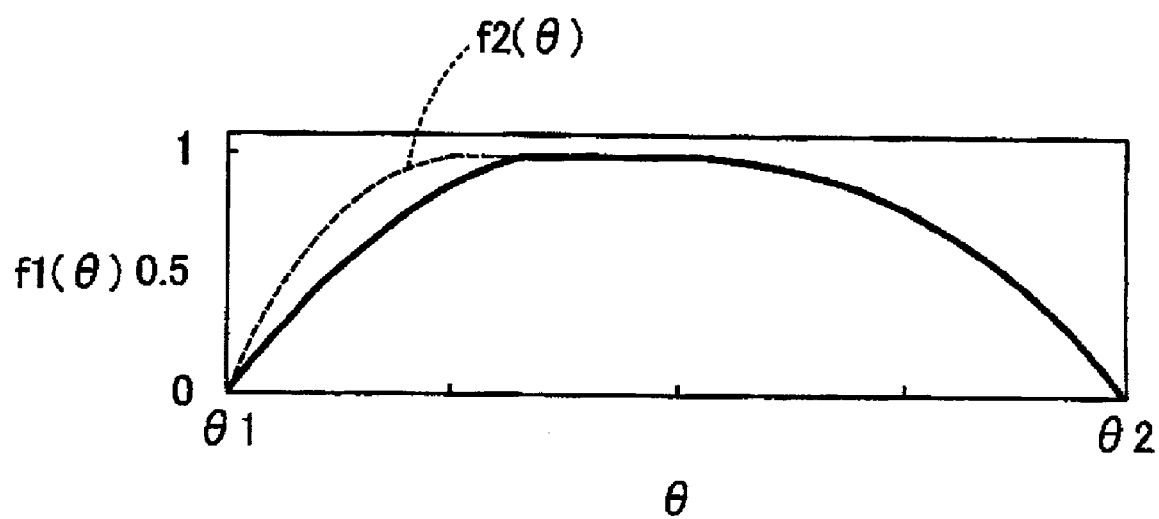
FIG. 19 is coefficient f (θ) range illustration for explaining different values of parameters assigned for each color gamut.
Figure 20:
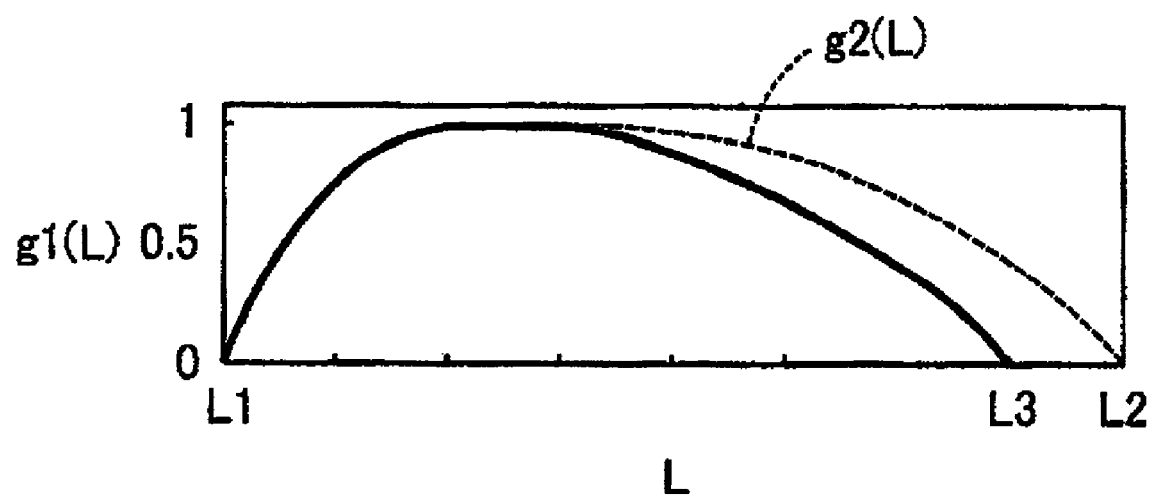
FIG. 20 is coefficient g (L) range illustration for explaining different values of parameters assigned for each color gamut.

FIGS. 18 to 20 are provided for explaining different parameter values assigned for each color gamut of printer in the processing of hue rotation. In Embodiment 3, the maximum hue rotational displacement Δθ2max is assumed identical to the maximum hue rotational displacement Δθmax used in the color gamut form shown in FIG. 10. The rotational displacement coefficients f2 (θ) and g2 (L) are assumed identical to the rotational displacement coefficients f (θ) and g (L) shown in FIGS. 8 and 9, respectively. Parameter values different from the above ones are given in FIGS. 18 to 20, which are used for creating the LUT 15b that is prepared for paper photol. These parameter values apply to creating the LUT for the printer's color gamut that is larger than that mapped with the parameters shown in FIGS. 8, 9, and 10.

FIG. 18 is provided to explain the displacement by hue rotation that is set smaller for greater color gamut. FIG. 18 shows mapping of the color gamut (Lab) of display 18 and the color gamut P1 of printer 40 for the combination of ink set A and paper photol on the a-b plane (L=20) in the Lab space. The color gamut mapping shown in FIG. 18 is obtained under the same conditions as for the mapping shown in FIG. 10. Thus, comparison can be made between the color gamut for the combination of ink set A and paper photol and the color gamut for the combination of ink set A and paper photo 2. In FIG. 18, a vertex of the color gamut (Lab) of display 18 in the second quadrant is coordinate point F as is the case in FIG. 10 and a point to which the coordinate point F rotates by hue angle θ' is coordinate point Q. When the coordinate point Q is compressed, it moves to coordinate point Q' at which the line OQ and the top edge of the color gamut P1 intersect. Here, O-F' distance n, O-F distance is m+n, O-Q distance is m'+n', and O-Q' distance is n'.

As apparent by comparison between FIG. 10 and FIG. 18, at L=20, the color gamut P1 is larger than the color gamut P in the first and second quadrants in the forward direction of b. In order that the absolute chroma n' after hue rotation and compression will be the same for the gamut shown in FIG. 10 and the gamut shown in FIG. 18, different rotation angles θ and θ' are applied with the relation of "θ'<θ" by comparison. When the color gamut of printer 40 is greater, a smaller rotation angle is sufficient to give sufficient chroma by hue rotation. In Embodiment 3, based on the relationship between a color gamut shape and the hue-rotation angle required, the color rotation angle is set smaller for greater color gamut and Δθ1max to Δθmax are set, according to the above relationship.

Although the color gamut P1 shown in FIG. 18 is larger than the color gamut P, the tendency that the color gamut P is greater than the color gamut (Lab) of display 18 around the hue angle of 180° and in a certain lightness range is true for the color gamut P1 as well as the color gamut P. As for the dependence of the rotational displacements on the hue angles and lightness change, also, the value range is reduced or the curve is gentler with the same tendencies as shown in FIGS. 8 and 9 being kept, so that the rotational displacement will be smaller for greater color gamut. Specifically, a rotational displacement coefficient f1 (θ) is applied that varies within the range of "θ1≦θ≦θ2" as shown in FIG. 19; it is a function that assumes "1" in a given range of hue angles between θ1 and θ2 and its curve when the angle θ increases from θ1 is gentler than the curve of f2 (θ). A rotational displacement coefficient g1 (L) is applied that varies in the range of "L1≦L≦L2" (L3≦L2) as shown in FIG. 20; it is a function that assumes "1" in a given range of lightness between L1 and L3 and its curve when lightness L decreases to L3 is gentler than the curve of g2 (L).

When creating the LUT 15b, the above-mentioned parameter values different from those used when creating the LUT 15c are used to reduce the displacement by rotation and assigned to the equation (1) when executing the calculation in the step S220 in FIG. 6. Thereby, for greater color gamut, such an LUT is created that prevents excessive hue rotation and unnatural color transformation. On the other hand, the color gamut for the combination of ink set A and plain paper is smaller. In this case, the above-mentioned parameter values are set to give a larger color gamut rotation angle. Consequently, sufficient chroma can be obtained and it is not necessary to execute high-rate color gamut compression, and color unbalancing can be prevented. For other LUTs, by properly selecting optimum values of parameters for a gamut of the printer's color gamut, adjustment can be made to small difference in the color gamut shape.

Of course, the parameter values shown in FIG. 17 are exemplary. The parameter values may be set different for all of printer's color gamuts and common parameter values other than those given in FIG. 17 maybe applied for different sizes of color gamut. If the LUTs 15b to 15g are arranged for color gamuts of printer in this way, the color transformation module 21b of the PRTDRV 21 enables the computer to perform color transformation that gives sufficient chroma to prevent color unbalancing adaptively for each combination of ink set and image-processing medium and print operation.

(7) Preferred Embodiment 4

Although relatively small displacement by rotation is set for greater color gamut in the Embodiment 3, it is not always necessary to apply this tendency to all color gamuts of printer when executing the processing of hue rotation. FIG. 21 shows a table listing symbolic values of parameters given for each combination of ink set and image-processing medium, which are used for hue rotation, according to a preferred Embodiment 4. Most of the parameter values given in FIG. 21 are the same as given in FIG. 17, but some of them are different. Specifically, when creating an LUT 15d for the combination of ink set A and plain paper, maximum hue rotational displacement Δθ3max' is used.

Hereon, actual values are assigned, subject to constraint: Δθ1max<Δθ2max<Δθ3max'. In Embodiment 4, for the printer's color gamut for the combination of ink set and plain paper, the displacement by hue rotation is set smaller, though its size is smaller than the color gamut for paper photo2. The displacement by hue rotation is set in conflict with the tendency that the displacement is set smaller for greater color gamut. This is intended to make the printer 40 output print results whose tone will be as uniform as possible with all image-processing media used.

Hue rotation in accordance with the present preferred embodiments is performed mainly in the low lightness range. While making chroma higher by rotating the hue tends to make the printed color image look better, excessive hue rotation, on the contrary, causes color unbalancing. For example, the color gamut whose map is almost nonexistent in the first and second quadrants at certain lightness must be rotated by quite a great angle to give chroma to a certain degree. However, such great rotation might produce apparently strange colors.

For the color gamut whose map is almost nonexistent in the first and second quadrants, when hue rotation is executed with the intention to give sufficient chroma, color unbalancing might occur. In such cases, restricting the rotation to a small angle generally produces better results in creating an LUT for kinds of images including a variety of colors. By correcting the displacement by rotation in conflict with the tendency that the displacement is set smaller for greater color gamut as in the present preferred embodiment, color unbalancing can be prevented. In consequence, uniform tone print results can be produced with any image-processing medium used.

The adjustment of the displacement by rotation in conflict with the above tendency could be carried out for various intentions in addition to preventing color unbalancing of print results with uniform tone with any image-processing medium used as described above. For example, if other color processing is performed before or after the processing of hue rotation in accordance with the invention, it may be required for a particular color gamut of printer that the displacement by the hue rotation be corrected in conflict with the above tendency, so that correction accordant with the above tendency can eventually be attained as a whole.

(8) Preferred Embodiment 5

Figure 22:
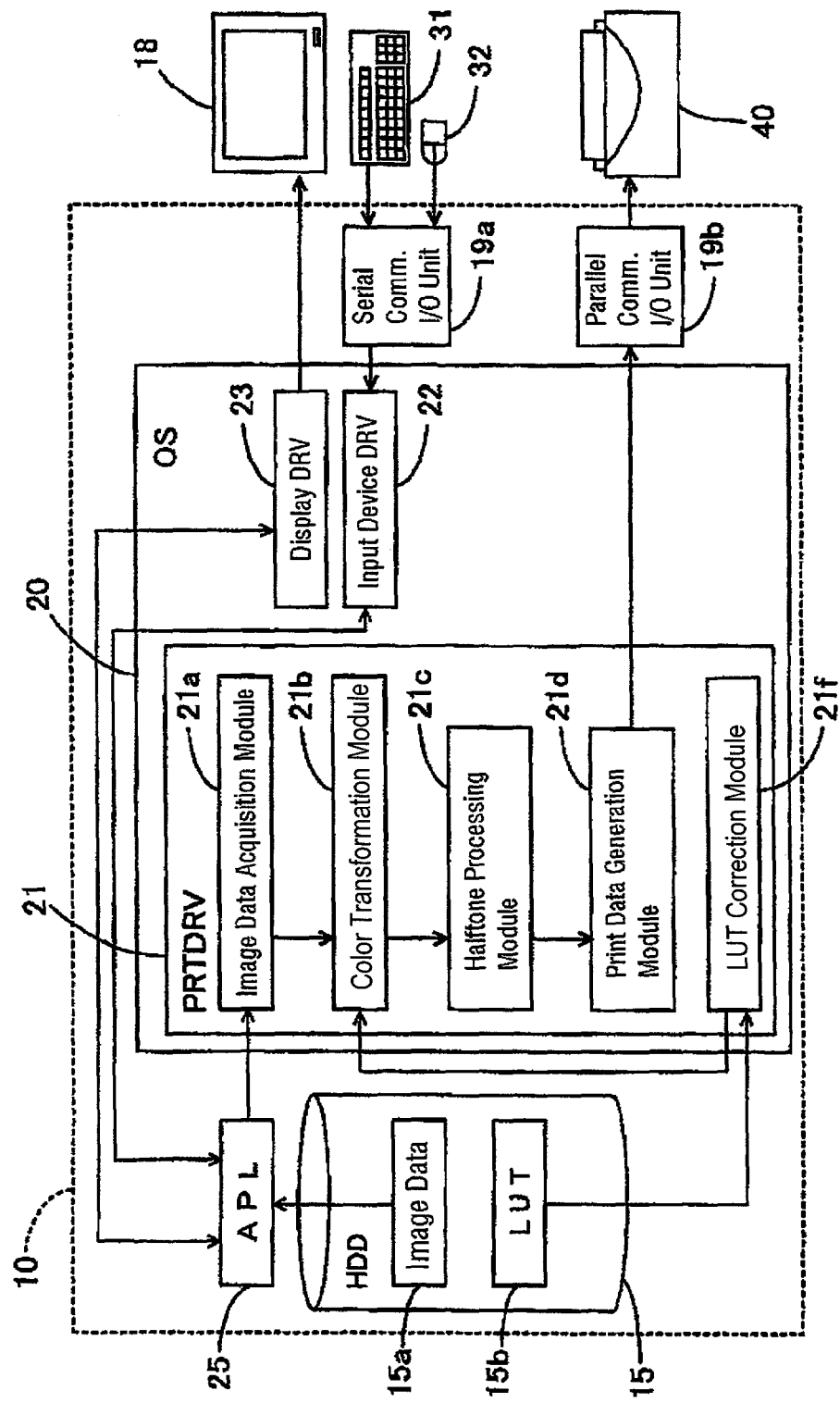
FIG. 22 is a block diagram showing the simplified structure of the OS and related components wherein the color transformation program is provided as the color transformation module, according to a preferred embodiment 5.

While a plurality of LUTs are created beforehand and arranged for color gamuts of printer in the Embodiments 3 and 4, it is not always necessary to create a plurality of LUTs beforehand. For example, it is also possible to once create and maintain one LUT or a few LUTs and correct some part of the LUT as required for adaptation for a plurality of shapes of the color gamut of printer. FIG. 22 shows the simplified structure of the OS and related components wherein a suitable LUT is created as required each time printing is performed so that color transformation will be executed adaptively for a plurality of shapes of the printer's color gamut under the PRTDRV 21.

In the structure shown in FIG. 22, which is nearly the same as that shown in FIG. 2, the PRTDRV 21 includes an LUT correction module 21f. The LUT correction module 21f makes the computer reference the LUT 15b which has previously stored in the disk on the HDD 15 and correct the LUT appropriately. In Embodiment 5, the module makes the computer execute correction in hue rotation for the data in the hue angle range of 40° to 240° and the lightness range of 0 to 80. In Embodiment 5 also, required information is obtained by receiving the status of printer 40 via the parallel communication I/O unit 19b and determining what image-processing medium and ink set are in use, based on the print condition setting specified, using a Printer Properties window which is not shown.

To execute print operation, the PRTDRV 21 follows nearly the same the procedure as shown in FIG. 3, but the LUT correction module 21f applied in Embodiment 5 is activated before the color transformation module is activated in the step S110. Under the control of the LUT correction module 21f, the LUT 15b is retrieved and corrected, based on the information of the currently used image-processing medium and ink set determined as described above. The thus corrected LUT is handed over to the color transformation module 21b under which color transformation of acquired image data is executed. Then, halftone processing and print data generation are executed, according to the procedure shown in FIG. 3 and eventually printing is performed.

In Embodiment 5, accordingly, even if a few LUTs are stored in the disk on the HDD 15, a suitable LUT is created for the currently used image-processing medium and ink set on the printer 40 and images can be printed in more vivid colors than those presented on the display 18. For the correction method by the LUT correction module 21f, any of diverse methods can be adopted. For example, one method is as follows. Based on the comparison in size between the printer's color gamut for which the LUT 15b has been created and maintained and the color gamut assumed for the currently used combination of image-processing medium and ink set, the color transformation data is modified to shift in the coordinates in the hue angle range of 40° to 240° and the lightness range of 0 to 80. Another method is as follows. By comparing the reference LUT 15b and another LUT for another printer's color gamut, color data of difference at sample points is maintained and a new LUT is set by replacing that color data of difference at sample points by newly obtained data.

(9) Preferred Embodiment 6

Figure 23:
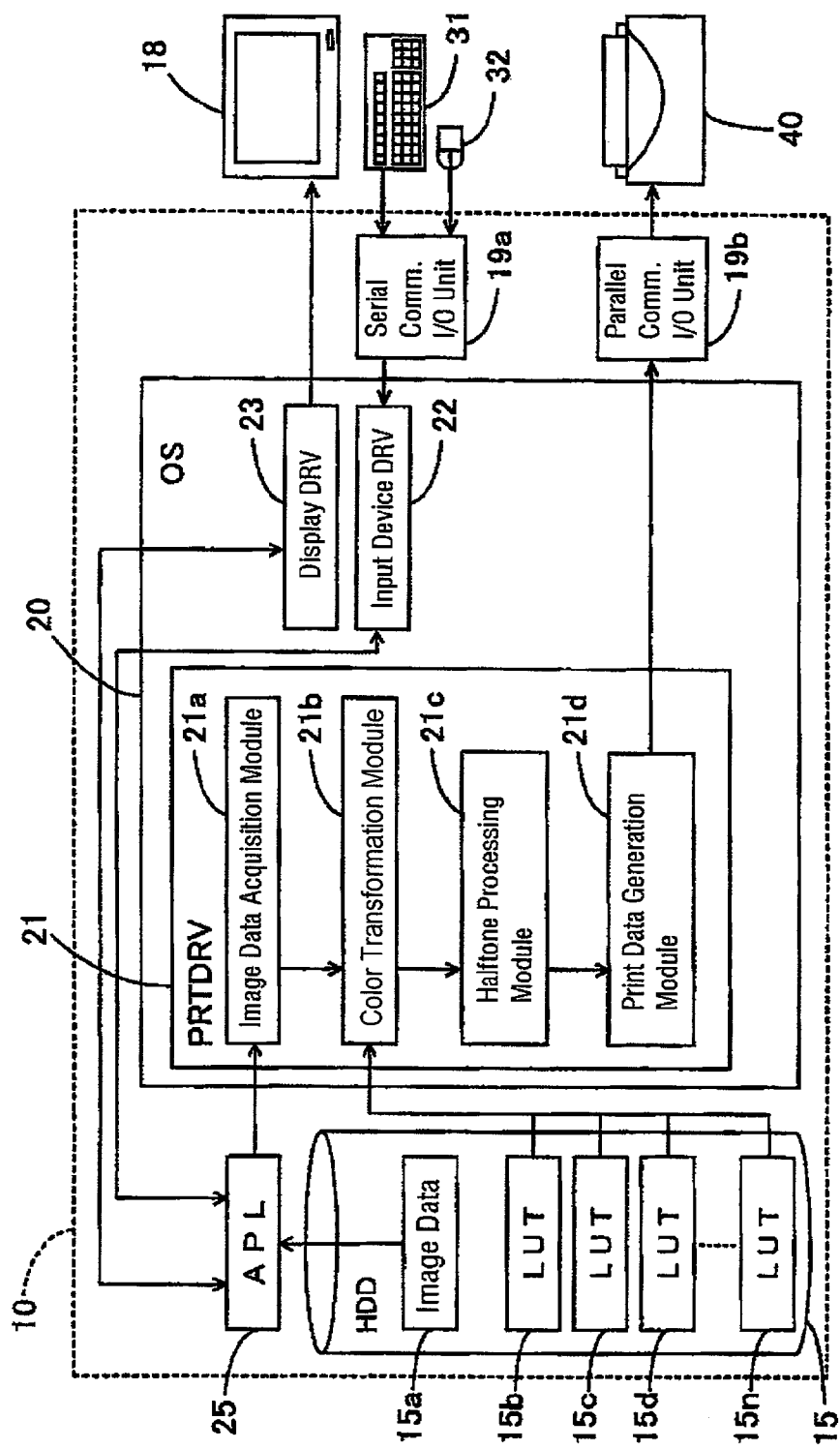
FIG. 23 is a block diagram showing the simplified structure of the OS and related components wherein the color transformation program is provided as the color transformation module, according to a preferred embodiment 6.

Using LUTs created through the processing of hue rotation in accordance with the invention is advantageous in that color unbalancing can be prevented. On the other hand, it is advisable to enable the user to choose whether to use LUTs provided in accordance with the invention to meet the user's need that may differ, according to circumstances. FIG. 23 shows the simplified structure of the OS and related components wherein LUTs, some of which have been created through the processing of hue rotation in accordance with the invention, and some of which have been created without being modified by such processing, are made available under the PRTDRV 21. In the structure shown in FIG. 23, which is nearly the same as that shown in FIG. 2, arrangement is made such that the color transformation module 12b of the PRTDRV 21 selectively uses an appropriate LUT out of the LUTs 15b to 15n, according to mode-setting specified in advance.

The LUTs 15b to 15n includes those defined for each combination of image-processing medium and ink set as described above and those created without being modified by hue rotation. Specifically, even for a combination of image-processing medium and ink set, two types of LUTs, one created through hue rotation, the other created without being modified by hue rotation, are stored in the disk on the HDD 15.

Figure 24:
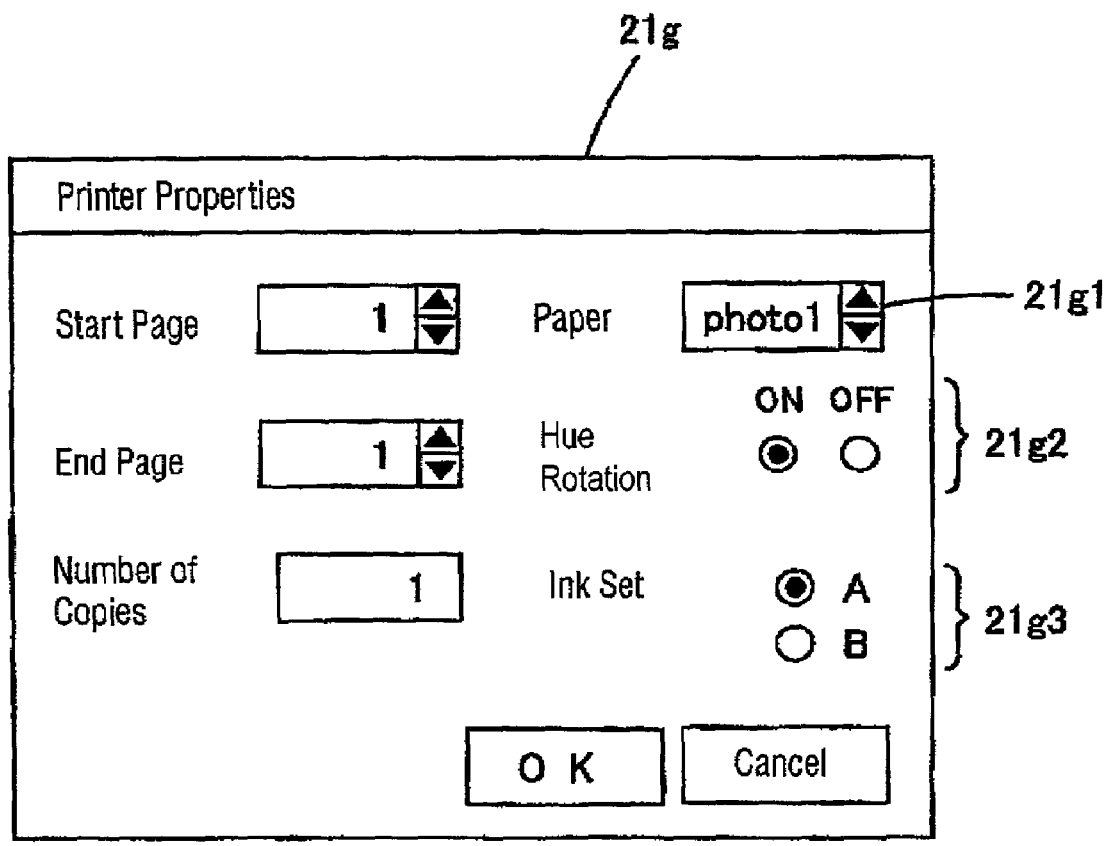
FIG. 24 shows an exemplary Printer Properties window.

Under the control of PRTDRV 21, the computer presents a Printer Properties window 21g on the display 17 when executing print operation; an example of this window is shown in FIG. 24. The Printer Properties window 21g have entry boxes for start page, end page, the number of copies, and other information required for printing, and the OK button to be used to request print execution, the Cancel button to be used to abort print operation, and the like. Inputs to the Printer Properties window 21g can be performed through the keyboard 31 and mouse 32.

In Embodiment 6, other information required for printing can be input, using the Printer Properties window 21g, and the PRTDRV21 selects an appropriate LUT, based on the information furnished. Specifically, the Printer Properties window 21g is also provided with a paper select box 21g1, mode select radio buttons 21g2, and ink set select radio buttons 21g3. The paper select box 21g1 allows the user to select paper to be used on the printer 40 from a pull-down menu listing preset kinds of paper. The ink set select radio buttons 21g3 allow the user to select an ink set to be used on the printer 40 by checking either radio button.

The mode select radio buttons 21g2 allows the user to choose whether to use LUTs created through hue rotation by checking the radio buttons ON/OFF. Based on user-preference setting, the color transformation module 21 of the PRTDRV 21 makes the computer extract an LUT suitable for the selected medium, ink set, and hue rotation ON/OFF from the HDD 15 and execute color transformation. If the radio button of hue rotation is set ON, an LUT created through the hue rotation is extracted. If the radio button of hue rotation is set OFF, an LUT created without being modified by hue rotation is extracted.

In this way, in Embodiment 6, whether to use LUTs created through hue rotation can be set, according to user preference, and whether to print an image presented on the display 18 with color unbalancing prevention effected, using LUTs provided in accordance with the invention, can be determined at the discretion of the user. If LUTs have been created without being modified by hue rotation for some purpose, it can be said that Embodiment 6 allows for choice between such purpose and the purpose of the invention when executing print operation. For example, if LUTs created without being modified by hue rotation are suitable for reproducing colors visible on the display 18 as faithfully as possible, Embodiment 6 allows for choice of whether to print an image in exactly the same colors as visible on the display 18.

In Embodiment 6, as a label for options of LUTs, instead of the explicit one shown in FIG. 24 for choice of hue rotation, a sensuous word may be used that allows the user to select a mode, appreciating what kind of effect it produces. With this change, also, in the same configuration as shown is FIG. 21, for a combination of image-processing medium and ink set, an LUT created through hue rotation and an LUT created without being modified by hue rotation are stored in the disk on the HDD 15.

Figure 25:
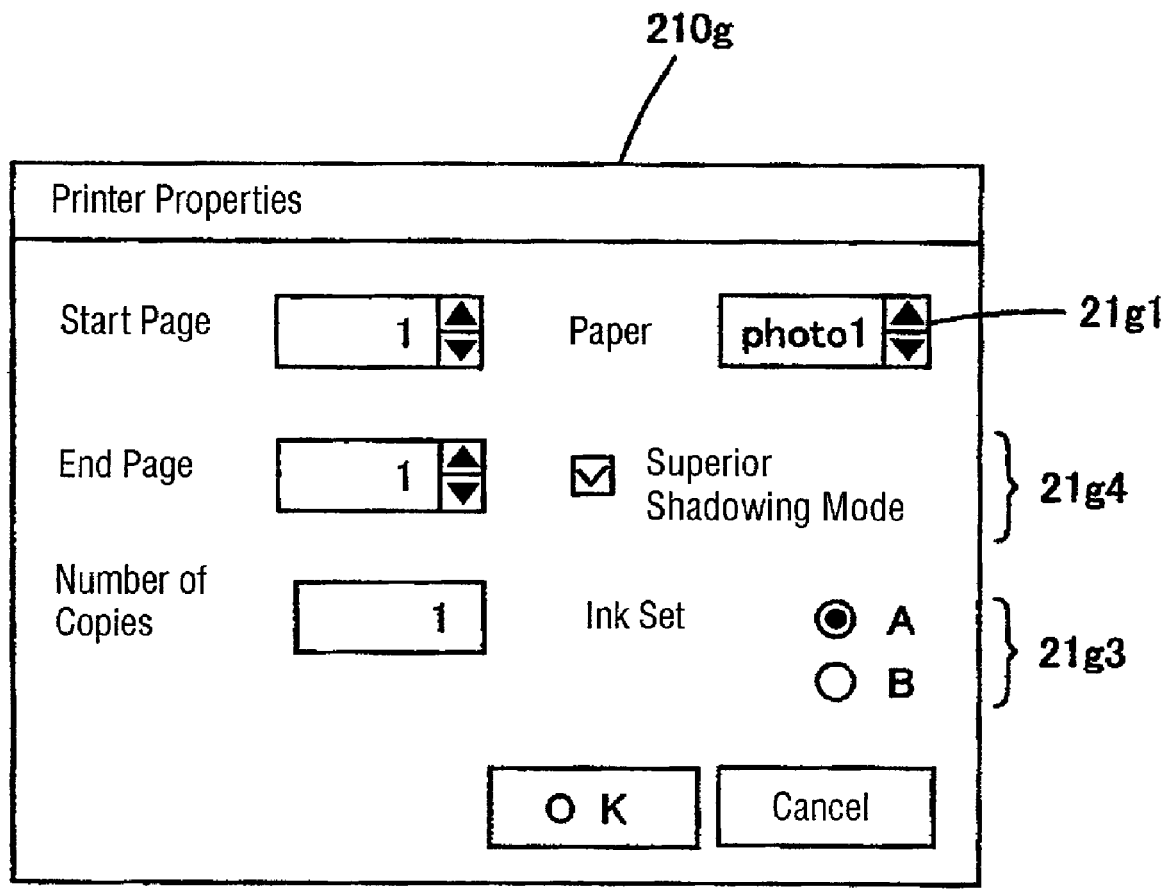
FIG. 25 shows another exemplary Printer Properties window.

Under the control of the PRTDRV 21, instead of the Printer Properties window 21g shown in FIG. 24, for example, a Printer Properties window 210g which is shown in FIG. 25 may be presented. On the Printer Properties window 210g, a mode select checkbox 21g4 instead of the radio buttons for mode selection on the window shown in FIG. 24 is provided for allowing the user to choose whether to apply a superior shadowing mode. When the checkbox is checked, the color transformation module 21b of the PRT-DRV 21 makes the computer execute color transformation, using an LUT created through hue rotation.

Accordingly, when an image presented on the display 18 is printed, the printed image is free from discoloration that low-lightness green looks dark brown by contrast with green in the surroundings. When the checkbox is not checked, the color transformation module 21b of the PRTDRV 21 makes the computer execute color transformation, using an LUT created without being modified by hue rotation. If a rather sensuous word is used as the label of a mode, even beginners not having sufficient knowledge could properly carry out printing with an appropriate LUT selected by their preference.

As explained above, in accordance with the invention, the color gamut of a first image processing device is rotated by a certain hue angle and compressed to fall within the color gamut of the second image processing device, and color values in the former color gamut are mapped to those in the later color gamut. Accordingly, by color transformation based on this mapping, the second color image data optimized by the rotation of the hue angle of the first color image data can be obtained. In circumstances where a plurality of color gamuts are available on an image processing device, gamut mapping relationships between the first and second image processing devices are defined adaptively for each gamut, thereby finer adjustment can be performed. In consequence, color gamut mapping of the first and second image processing devices in a device-independent color space, wherein there is great difference between their color gamut volumes, can be corrected so that color unbalancing can be prevented even for different forms of color gamut that is the target gamut of color output.

The invention may be embodied in other specific forms without departing from the spirit or essential characteristics thereof. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within the scope of the claims.

We claim:

1. A medium recording a color transformation lookup table to be referenced for transforming first color image data used on a first image processing device into second color image data used on a second image processing device and having a first set of values and a second set of values that represent the relationship between color gamuts of the first image processing device and the second image processing device, wherein, in said color transformation lookup table, said relationship is obtained through a process that comprises a step in which, in a certain color region in a color space, the hue angle of the second color image data is determined by rotating the hue angle of the corresponding first color image data; and wherein said relationship between color gamuts of the first image processing device and the second image processing device is defined through a process comprising:

a step where hue angle of the color gamut of the first image processing device is rotated by a predetermined angle in a certain color region in the device-independent color space;

and a step where the rotated gamut after the hue-angle rotation is compressed to fall within the color gamut of the second image processing device.

2. A medium recording a color transformation lookup table as recited in claim 1, wherein:

said certain color region in the color space has an extent that is defined by lightness and hue.

3. A medium recording a color transformation lookup table as recited in claim 1, wherein:

said first image processing device is a display and said second image processing device is a printer; and for transforming the first color image data expressed in an RGB color space into the second color image data expressed in a CMYK color space, said relationship between color gamuts of the first image processing device and the second image processing device is defined in such a manner that the first color image data is transformed into color data based on a predetermined device-independent space, said color data is modified by executing said step of hue-angle rotation, and the second color image data is obtained by transforming said modified color data into the second color image data.

4. A medium recording a color transformation lookup table as recited in claim 1, wherein:

said first set of values and second set of values of a color transformation lookup table are defined after increasing or decreasing the number of color components of a color space to which said color gamut belongs.

5. A medium recording a color transformation lookup table as recited in claim 1, wherein:

for defining said relationship between color gamuts of the first image processing device and the second image processing device, said step of hue-angle rotation is executed on the condition that a compression rate estimated for compression without the application of hue-angle rotation exceeds a predetermined threshold value thereof.

6. A medium recording a color transformation lookup table as recited in claim 1, wherein:

for defining said relationship between color gamuts of the first image processing device and the second image processing device, said step of hue-angle rotation is executed on the condition that chroma estimated to be given after compression without the application of hue-angle rotation is lower than a predetermined threshold value thereof.

7. A medium recording a color transformation lookup table as recited in claim 1, wherein:

for defining said relationship between color gamuts of the first image processing device and the second image processing device, said step of hue-angle rotation is executed on the condition that a ratio obtained by dividing chroma estimated to be given after compression with the application of hue-angle rotation, by chroma estimated to be given after compression without the application of hue-angle rotation, exceeds a predetermined threshold value thereof.

8. A medium recording a color transformation lookup table as recited in claim 1, wherein:

in said relationship between color gamuts of the first image processing device and the second image processing device, said hue-rotation angle is determined as a function of any of or combination of lightness, chroma, and hue before hue-angle rotation.

9. A medium recording a color transformation lookup table as recited in claim 8, wherein:

if the shapes of the gamuts of the second image processing device differ from each other, any of or combination of lightness, chroma, and hue dependence of said hue-rotation angle in said function vary.

10. A medium recording a color transformation lookup table as recited in claim 1, wherein:

if a region where most of the color gamut of the first image processing device lies out of the color gamut of the second image processing device exists and at the same time its neighboring region has a wider color gamut of the second image processing device than that of the first image processing device, the hue angle is rotated toward the neighboring region to thereby define said relationship of color gamut.

11. A medium recording a color transformation lookup table as recited in claim 1, wherein:

if a region where the color gamut of the second image processing device is smaller than that of the first image processing device exists and at the same time its neighboring region has a larger color gamut of the second image processing device than that of said region, the hue-angle is rotated toward said larger color gamut to thereby define said relationship of color gamut.

12. A medium recording a color transformation lookup table as recited in claim 1, wherein:

plural color gamuts of different shapes are available to any of or combination of the first image processing device and the second image processing device, and said sets of values can be defined so as to represent the relationship of any pairs of color gamuts.

13. A medium recording a color transformation lookup table as recited in claim 1, wherein:

plural color gamuts of different shapes are available to any of or combination of the first image processing device and the second image processing device, said relationship between color gamuts of the first image processing device and the second image processing device are defined by different hue-angle rotations for each of the plural color gamuts.

14. A medium recording a color transformation lookup table as recited in claim 1, wherein:

if there is a small color gamut in the color gamuts of the second image processing device, the hue-rotation angle of the small color gamut is set greater than that of the other color gamut of the second image processing device.

15. A medium recording a color transformation lookup table as recited in claim 14, wherein:

the hue-rotation angle of a certain exceptional color gamut of the second image processing device is set smaller than the other, where this exceptional color gamut of the second image processing device is smaller than the other color gamut of the second image processing device.

16. A medium recording a color transformation lookup table as recited in claim 1, wherein:

said relationship between color gamuts of the first image processing device and the second image processing device is obtained by correcting the sets of values which are stored in a certain storage area and represent the relationship of the color gamuts.

17. A medium recording a color transformation lookup table as recited in claim 1, wherein:

the sets of values which represent the relationship with the application of hue-angle rotation and the relationship without the application of hue-angle rotation are made and stored in a certain storage area; and the relationship is decided based on the mode which is selected in advance by a user.

18. An apparatus for printing based on a color transformation lookup table to be referenced for transforming first color image data used on a first image processing device into second color image data used on a second image processing device and having a first set of values and a second set of values that represent the relationship between color gamuts of the first image processing device and the second image processing device, wherein said relationship between color gamuts of the first image processing device and the second image processing device is obtained through a process that comprises a step in which, in a certain color region in a color space, the hue angle of the second color image data is determined by rotating the hue angle of the corresponding first color image data.

19. A method for printing based on a color transformation lookup table to be referenced for transforming first color image data used on a first image processing device into second color image data used on a second image processing device and having a first set of values and a second set of values that represent the relationship between color gamuts of the first image processing device and the second image processing device, wherein said relationship between color gamuts of the first image processing device and the second image processing device is obtained through a process that comprises a step in which, in a certain color region in a color space, the hue angle of the second color image data is determined by rotating the hue angle of the corresponding first color image data.

20. A medium recording a computer-executable printing program for printing based on a color transformation lookup table to be referenced for transforming first color image data used on a first image processing device into second color image data used on a second image processing device and having a first set of values and a second set of values that represent the relationship between color gamuts of the first image processing device and the second image processing device, wherein said relationship between color gamuts of the first image processing device and the second image processing device is obtained through a process that comprises a step in which, in a certain color region in a color space, the hue angle of the second color image data is determined by rotating the hue angle of the corresponding first color image data.

21. An apparatus for transforming first color image data used on a first image processing device into second color image data used on a second image processing device, based on a color transformation lookup table to have a first set of values and a second set of values that represent the relationship between color gamuts of the first image processing device and the second image processing device, wherein said relationship between color gamuts of the first image processing device and the second image processing device is obtained through a process that comprises a step in which, in a certain color region in a color space, the hue angle of the second color image data is determined by rotating the hue angle of the corresponding first color image data.

22. A computer readable medium for recording a color transformation program for transforming RGB data into CMY data, wherein said color transformation program allows a computer to transform the RGB data used on a display into the CMY data used on a printer, based on said color transformation table stored in advance into a certain storage area and created by following steps of:

executing hue-angle rotation by rotating coordinate points in the color gamut of the display toward the wider color gamut of the printer, on condition that the region is found to exist where most of the color gamut of the display lies out of the color gamut of the printer; besides the color gamut of the printer is wider than the color gamut of the display near the region, based on a comparison between the color gamut of the display and the color gamut of the printer mapped in a color space defining colors in terms of lightness, chroma, and hue;

decreasing hue-rotation angle toward the boundary of the color gamut;

compressing, after said hue-angle rotation, the rotated region that still remains out of the color gamut of the printer, toward the direction of chroma zero;

and mapping the coordinates which are the result of said rotation and compression, and the coordinates of the color gamut of the display before the actions of hue-angle rotation and compression.

* * * * *